(12) United States Patent
Venkatesh et al.

(10) Patent No.: US 12,736,242 B2
(45) **Date of Patent: *Sep. 15, 2026**

(54) PREDICTIVE TEMPERATURE SCHEDULING FOR A THERMOSTAT USING MACHINE LEARNING

(71) Applicant: Lennox Industries Inc., Richardson, TX (US)

(72) Inventors: Sridhar Venkatesh, Irving, TX (US); Payam Delgoshaei, Addison, TX (US); Janathkumar Manohararaj, McKinney, TX (US)

(73) Assignee: Lennox Industries Inc., Richardson, TX (US)

( * ) Notice: Subject to any disclaimer, the term of this patent is extended or adjusted under 35 U.S.C. 154(b) by 496 days.

This patent is subject to a terminal disclaimer.

(21) Appl. No.: 18/340,116

(22) Filed: Jun. 23, 2023

(65) Prior Publication Data

US 2023/0332790 A1 Oct. 19, 2023

Related U.S. Application Data

(63) Continuation of application No. 17/655,936, filed on Mar. 22, 2022, now Pat. No. 11,774,129, which is a (Continued)

(51) Int. Cl.

*F24F 11/46* (2018.01)
*F24F 11/64* (2018.01)

(Continued)

(52) U.S. Cl.

CPC .............. *F24F 11/46* (2018.01); *F24F 11/64* (2018.01); *F24F 11/65* (2018.01);

(Continued)

(58) Field of Classification Search

CPC .. F24F 11/46; F24F 11/64; F24F 11/65; F24F 2110/10; F24F 2140/60; F24F 2120/12;

(Continued)

(56) References Cited

U.S. PATENT DOCUMENTS

| | | |
|---|---|---|
| 11,193,683 B2 | 12/2021 | Venkatesh et al. |
| 11,255,561 B2 | 2/2022 | Venkatesh et al. |

(Continued)

*Primary Examiner* — Jigneshkumar C Patel

(57) ABSTRACT

A heating, ventilation, and air conditioning (HVAC) control device configured to receive a user input for controlling an HVAC system, to determine whether the user input indicates an energy saving occupancy setting, and to identify a first plurality of time entries that are associated with a confidence level for a predicted occupancy status that is less than a predetermined threshold value in the predicted occupancy schedule. The device is further configured to modify the predicted occupancy schedule by setting the first plurality of time entries to an away status when the user input indicates an aggressive energy saving occupancy setting. The device is further configured to modify the predicted occupancy schedule by setting the second plurality of time entries to a present status when the user input indicates a conservative energy saving occupancy setting. The device is further configured to output the modified predicted occupancy schedule.

8 Claims, 12 Drawing Sheets

Related U.S. Application Data continuation of application No. 16/731,995, filed on Dec. 31, 2019, now Pat. No. 11,320,165.

(51) Int. Cl.

| | |
|---|---|
| ***F24F 11/65*** | (2018.01) |
| ***F24F 110/10*** | (2018.01) |
| ***F24F 120/10*** | (2018.01) |
| ***F24F 120/12*** | (2018.01) |
| ***F24F 140/50*** | (2018.01) |
| ***F24F 140/60*** | (2018.01) |
| ***G05B 13/02*** | (2006.01) |
| ***G05B 13/04*** | (2006.01) |

(52) U.S. Cl.

CPC ....... *G05B 13/0265* (2013.01); *G05B 13/048* (2013.01); *F24F 2110/10* (2018.01); *F24F 2120/10* (2018.01); *F24F 2120/12* (2018.01); *F24F 2140/50* (2018.01); *F24F 2140/60* (2018.01)

(58) Field of Classification Search

CPC .............. F24F 2140/50; F24F 2120/10; G05B 13/048; G05B 13/0265

USPC .......................................................... 700/278

See application file for complete search history.

(56) References Cited

U.S. PATENT DOCUMENTS

| | | | | |
|---|---|---|---|---|
| 2011/0213588 | A1* | 9/2011 | Lin ...................... | G05B 13/048 702/179 |
| 2012/0066168 | A1* | 3/2012 | Fadell .................. | H05B 47/115 702/140 |
| 2012/0131504 | A1 | 5/2012 | Fadell et al. | |
| 2012/0310376 | A1 | 12/2012 | Krumm et al. | |
| 2015/0006463 | A1 | 1/2015 | Fadell et al. | |
| 2016/0305678 | A1 | 10/2016 | Pavlovski | |
| 2019/0338976 | A1 | 11/2019 | Chakraborty et al. | |
| 2021/0199326 | A1 | 7/2021 | Venkatesh et al. | |
| 2021/0199328 | A1 | 7/2021 | Venkatesh et al. | |

* cited by examiner

602

| TIMESTAMP | SETPOINT TEMPERATURE | OCCUPANCY STATUS |
|---|---|---|
| 8 | 72 | 1 |
| 9 | 72 | 1 |
| 10 | 78 | 0 |
| 11 | 78 | 0 |
| ⋮ | ⋮ | ⋮ |

116, 120, 118, 604

$$P_{present} = W_1 - W_2 D_{MON} - W_3 D_{TUE} - W_3 D_{WED} \circ\circ\circ - W_N TS_{1\text{-}2PM} - W_{N+1} TS_{2\text{-}3PM} \circ\circ\circ$$

804 802 802A 806 802B 806 802C 806

802D 806 802E 806

110

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Monday | 1 | 1 | 1 | 1 | 1 | 1 | 1 | 0 | 0 | 0 | 0 | 0 | 0 | 0 | 0 | 0 | 0 | 1 | 1 | 1 | 1 | 1 | 1 | 1 |
| Tuesday | 1 | 1 | 1 | 1 | 1 | 1 | 1 | 0 | 0 | 0 | 0 | 0 | 0 | 0 | 0 | 0 | 0 | 1 | 1 | 1 | 1 | 1 | 1 | 1 |
| Wednesday | 1 | 1 | 1 | 1 | 1 | 1 | 1 | 0 | 0 | 0 | 0 | 0 | 0 | 0 | 0 | 0 | 0 | 1 | 1 | 1 | 1 | 1 | 1 | 1 |
| Thursday | 1 | 1 | 1 | 1 | 1 | 1 | 1 | 0 | 0 | 0 | 0 | 0 | 0 | 0 | 0 | 0 | 0 | 1 | 1 | 1 | 1 | 1 | 1 | 1 |
| Friday | 1 | 1 | 1 | 1 | 1 | 1 | 1 | 0 | 0 | 0 | 0 | 0 | 0 | 0 | 0 | 0 | 0 | 1 | 1 | 1 | 1 | 1 | 1 | 1 |
| Saturday | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Sunday | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

902

904

PREDICTIVE TEMPERATURE SCHEDULING FOR A THERMOSTAT USING MACHINE LEARNING

CROSS-REFERENCE TO RELATED APPLICATIONS

This application is a continuation of U.S. patent application Ser. No. 17/655,936 filed Mar. 22, 2022, and entitled "PREDICTIVE TEMPERATURE SCHEDULING FOR A THERMOSTAT USING MACHINE LEARNING," now U.S. Pat. No. 11,774,129, issued Oct. 3, 2023, which is a continuation of U.S. patent application Ser. No. 16/731,995 filed Dec. 31, 2019, and entitled "PREDICTIVE TEMPERATURE SCHEDULING FOR A THERMOSTAT USING MACHINE LEARNING," now U.S. Pat. No. 11,320,165, issued May 3, 2022, which are all incorporated herein by reference.

TECHNICAL FIELD

The present disclosure relates generally to thermostat control for a heating, ventilation, and air conditioning (HVAC) system, and more specifically to predictive temperature scheduling for a thermostat using machine learning.

BACKGROUND

Existing heating, ventilation, and air conditioning (HVAC) systems typically rely on a user (e.g. a home owner) to provide scheduling information about when they will be home or away. However, some users may never provide this information to the HVAC system. Determining whether a home owner will be present or away without requiring the user to provide this information in advance poses several technical challenges because existing HVAC systems lack the capabilities to determine this information on their own. Without this information, an HVAC system is unable to provide energy saving benefits, for example reduced power consumption, and reduce the wear on its components because existing HVAC system are unable to automatically adjust set point temperatures without knowing whether a user is present. In some instances, it is not desirable for an HVAC system to make changes to a set point temperature while a user is present because these changes may affect the comfort level of the user.

SUMMARY

The system disclosed in the present application provides a technical solution to the technical problems discussed above by employing machine learning to learn and predict the behavior and preferences of a user. The disclosed system provides several practical applications and technical advantages which include a process for leveraging other devices that a user interacts with to collect information about the user's behavior and preferences. In one embodiment, the system comprises a device that is configured to collect information about whether a user is present or away based on a location of their user device, a travel direction for their user device, a network connection type that the user is using, their interactions with the thermostat, and their interactions with other types of devices. The device is further configured to interpolate and extrapolate the collected information to capture a user's behavior and preferences over some period of time. This information can then be used to generate or train a machine learning model to predict the user's behavior. This process improves the operation of the HVAC system by enabling the system to learn about a user's behavior and preferences based on their actions, rather than relying on the user to provide this information.

The disclosed system also provides a process for generating a machine learning model for predicting whether a user will be present or away from a space. In one embodiment, the system comprises a device that is configured to generate a machine learning model that uses collected user information to generate a predicted occupancy schedule that predicts whether a home owner will be home or away at various times of the day. The device can use the predicted occupancy schedule to control the HVAC system to provide energy savings by adjusting the set point temperature while the home owner is away. This process improves the performance of the HVAC system by enabling the HVAC system to predict when a user will be present or away so that the HVAC system can adjust a set point temperature to provide energy saving benefits and reduce the wear on the system's components.

The disclosed system also provides a process for conservatively or aggressively adjusting a predicted set point temperature to provide different levels of energy savings. In one embodiment, the system comprises a device that is configured to update a predicted occupancy schedule to use conservative or aggressive energy saving settings for controlling the HVAC system. The device may adjust values in the predicted occupancy schedule to improve energy saving benefits. For example, the device may update a predicted occupancy schedule to increase a cooling set point temperature to reduce the amount of energy consumed by the HVAC system. The device may use historical information for a user which allows the device to select a suitable set point temperature that reduces energy consumption while keeping the user comfortable. This process improves the performance of the HVAC system by enabling the HVAC system to offer a variety of energy saving settings which can further reduce power consumption and reduce the wear on the system's components.

The disclosed system also provides a process for correcting errors in a predicted occupancy schedule for a user. In one embodiment, the system comprises a device that is configured to periodically compare predicted occupancy statuses and set point temperatures to actual occupancy statuses and set point temperatures to determine how accurately a predicted occupancy schedule follows the actual behavior of a user. The device is configured to provide error correction to update the predicted occupancy schedule when the predicted occupancy schedule deviates from the actual behavior of a user. This process improves the performance of the HVAC system by enabling the HVAC system to periodically update its predictions on whether a user will be present or away. This process also improves the performance of the HVAC system by improving the accuracy of the machine learning model to predict an occupancy schedule for a user.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Information System Overview

Figure 1:
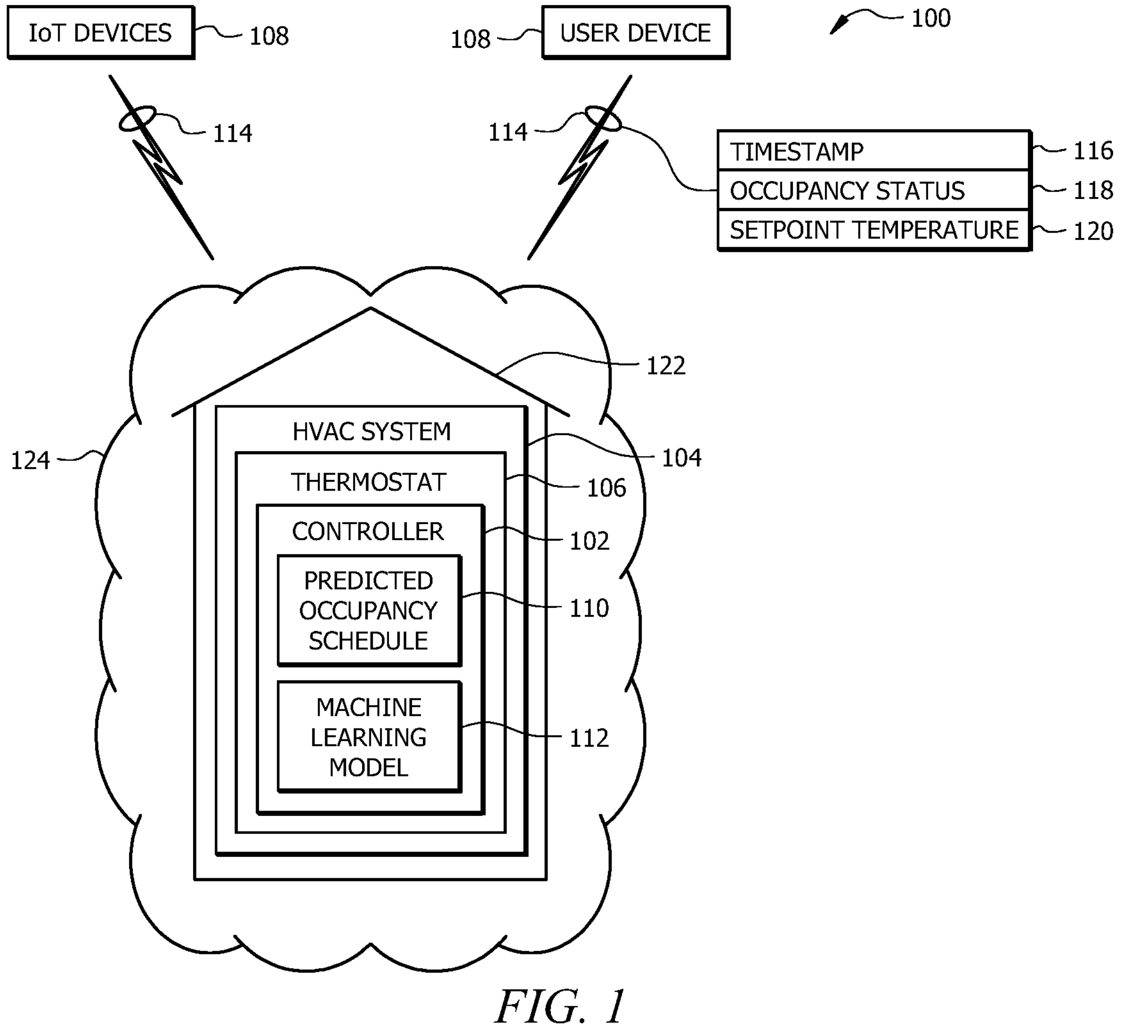
FIG. 1 is a schematic diagram of heating, ventilation, and air conditioning (HVAC) control system configured to use machine learning.

FIG. 1 is a schematic diagram of heating, ventilation, and air conditioning (HVAC) control system 100 that is configured to use machine learning. In one embodiment, the HVAC control system 100 comprises a controller 102, an HVAC system 104, a thermostat 106, and devices 108 that are in signal communication with each other in a network 124.

The network 124 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 124 may be configured to support any suitable type of communication protocol as would be appreciated by one of ordinary skill in the art.

The HVAC system 104 is generally configured to control the temperature of a space 122. Examples of a space 122 include, but are not limited to, a room, a home, an office, or a building. The HVAC system 104 may comprise a thermostat 106, compressors, blowers, evaporators, condensers, and/or any other suitable type of hardware for controlling the temperature of the space 122 as would be appreciated by one of ordinary skill in the art. An example of an HVAC system 104 configuration and its components is described below in FIG. 17. The HVAC system 104 comprises one or more thermostats 106 located within the space 122. A thermostat 106 may be a single-stage thermostat, a multi-stage thermostat, or any suitable type of thermostat as would be appreciated by one of ordinary skill in the art. The thermostat 106 is configured to allow a user to select a desired temperature or set point temperature for the space 122. The controller 102 may use information from the thermostat 106 such as the set point temperature for controlling a compressor and/or a blower. In one embodiment, the thermostat 106 and the controller 102 are integrated into a single device. In another embodiment, the thermostat 106 may be a device that is external from the controller 102. In this example, the thermostat 106 is in signal communication with the controller 102 using any suitable type of wired or wireless communications.

Figure 16:
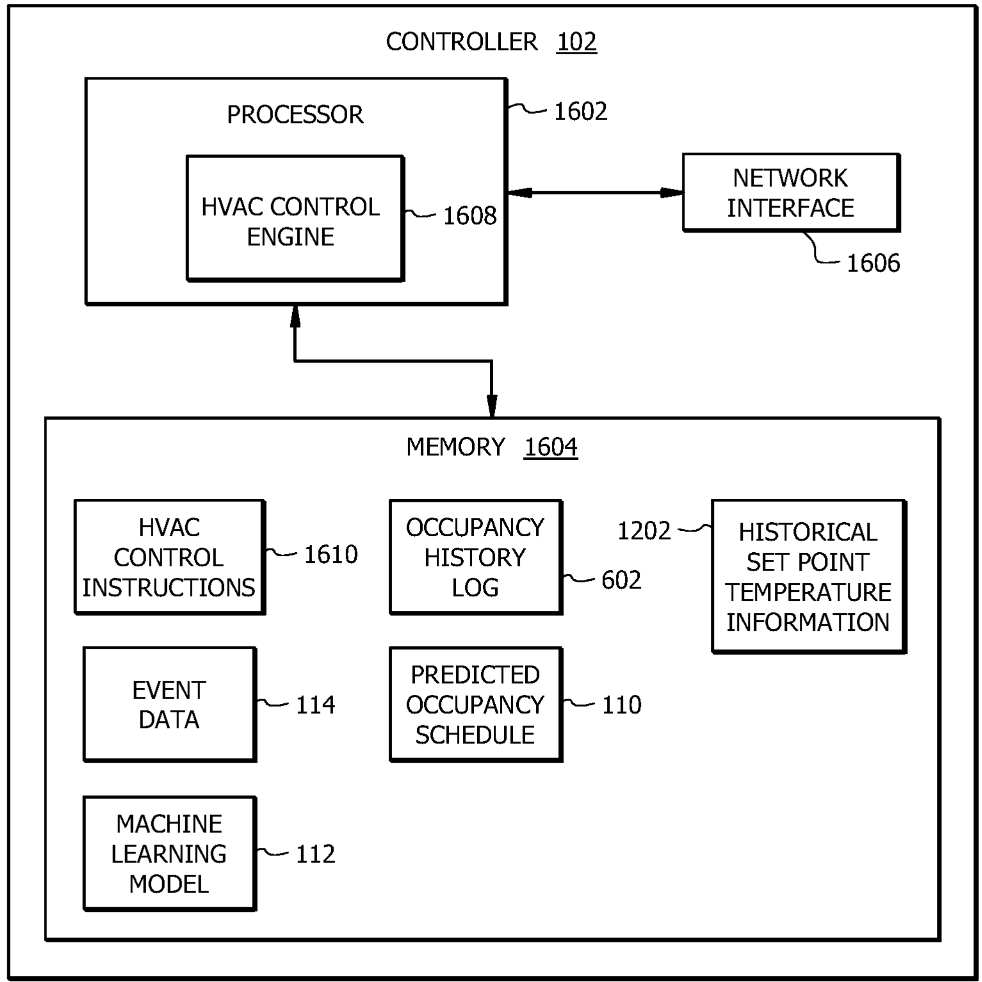
FIG. 16 is a schematic diagram of an embodiment of a device configured to control an HVAC system using machine learning.

An example of a hardware configuration for the controller 102 is described in FIG. 16. The controller 102 is generally configured to control the operation of the HVAC system 104 using machine learning. In one embodiment, the controller 102 is configured to collect event data 114 from one or more devices 108 to generate a machine learning model 112 for predicting an occupancy schedule and/or a set point temperature schedule for the space 122. Examples of devices 108 include, but are not limited to, computers, mobile devices (e.g. smart phones or tablets), user devices, Internet-of-things (IoT) devices, home automation devices, artificial intelligence (AI) devices, motion sensors, proximity sensors, or any other suitable type of device. An event is an action that is taken by a user that provides information to the controller 102 about a user's behavior or preferences. The event data 114 may comprise a timestamp 116 indicating a time when an event occurred, an occupancy status 118 (e.g. a present status or an away status) for a user, a set point temperature 120, a source identifier that identifies a data source (e.g. a device identifier), a user identifier, a space identifier, or any other suitable type of information. An example of the controller performing this process is described below in FIG. 2.

The controller 102 is further configured to generate a predicted occupancy schedule 110 based on the event data 114 that is collected from one or more devices 108. As an example, the controller 102 may generate a predicted occupancy schedule 110 that predicts whether a home owner will be home or away at various times of the day. The controller 102 can use the predicted occupancy schedule 110 to control the HVAC system 104 to provide energy savings by adjusting the set point temperature while the home owner is away. An example of the controller 102 performing this process is described below in FIG. 7.

The controller 102 is further configured to update a predicted occupancy schedule 110 to use conservative or aggressive energy saving settings for controlling the HVAC system 104. The controller 102 may adjust occupancy statuses 118 and/or set point temperature values 120 in the predicted occupancy schedule 110 to improve energy saving benefits. For example, the controller 102 may update a predicted occupancy schedule 110 to increase a cooling set point temperature to reduce the amount of energy consumed by the HVAC system 104. The controller 102 is configured to use historical information for a user which allows the controller 102 to select a suitable set point temperature that reduces energy consumption while keeping the user comfortable. For instance, historical information may comprise set point temperatures that a user has previously selected for the space 122 at various times of the year, for example over the past couple of months or years. An example of the controller 102 performing this process is described below in FIG. 11.

The controller 102 is further configured to perform error correction for a predicted occupancy schedule 110. For example, the controller 102 may periodically compare predicted occupancy statuses and set point temperatures to actual occupancy statuses and set point temperatures to determine how accurately a predicted occupancy schedule 110 follows the actual behavior of a user. The controller 102 is configured to provide error correction to update the predicted occupancy schedule 110 in response to determining that the predicted occupancy schedule 110 is deviating from the actual behavior of a user. An example of the controller 102 performing this operation is described below in FIG. 14.

In some embodiments, the controller 102 may be in signal communication with one or more remote data storage devices (e.g. servers, memories, or databases). In this case, the controller 102 may be configured to store the predicted occupancy schedule 110, the machine learning model 112, and/or any other suitable type of data remotely in a remote data storage device. In some embodiments, the controller 102 may be configured to perform one or more of the processes described below (e.g. methods 200, 700, 1100, and 1400) using remote computing or processing resources, for example using cloud computing.

Thermostat Scheduling Process

Figure 2:
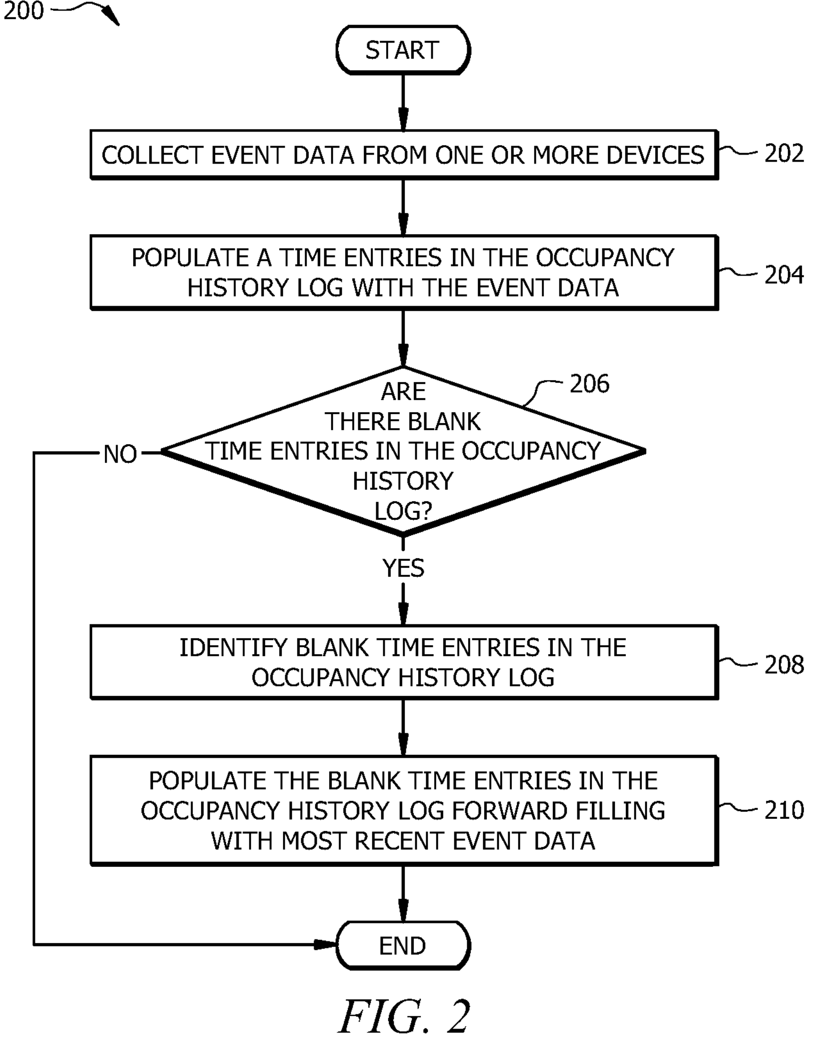
FIG. 2 is a flowchart of an embodiment of a thermostat scheduling method for an HVAC system.

FIG. 2 is a flowchart of an embodiment of a thermostat scheduling method 200 for an HVAC system 104. The controller 102 may employ method 200 to collect information about a user's behavior and habits for generating a machine learning model 112 that predicts whether the user will be present or away from a space 122 (e.g. a home) based on, for example, the day of the week and the time of the day. The collected information also trains the machine learning model 112 about what set point temperatures the user typically prefers when they are present in a space 122. The controller 102 may employ method 200 to collect information from a variety of devices 108 and to format the collected information so that it can be used for training a machine learning model 112. The machine learning model 112 can then be used to predict the user's behavior for scheduling and controlling a set point temperature for the space 122.

At step 202, the controller 102 collects event data 114 from one or more devices 108. The following are several non-limiting examples of how the controller 102 may collect event data 114 from other types of devices 108.

Collecting Event Data Based on a User Device Location

Figures 3, 4:
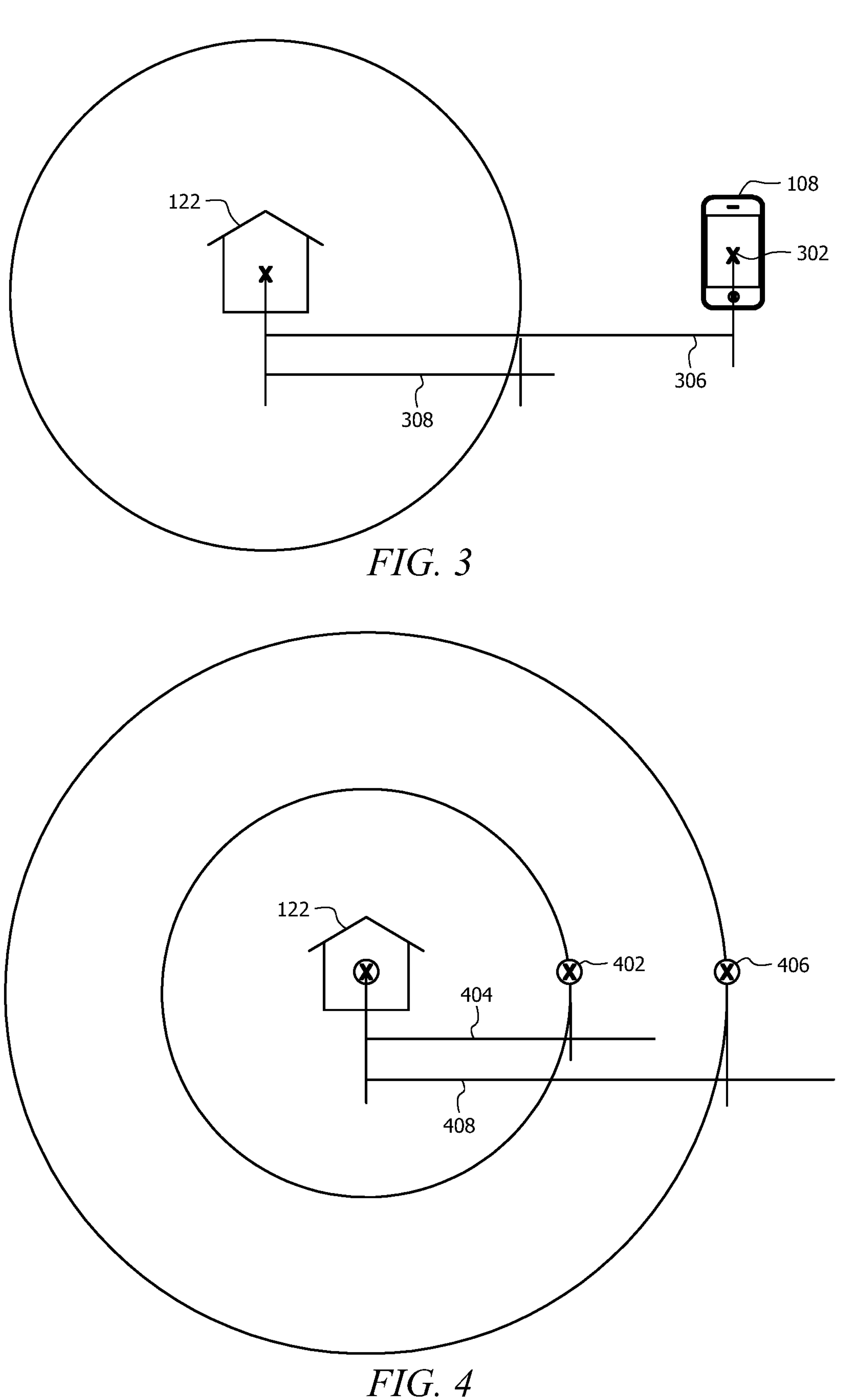
FIG. 3 is an example of an event data collecting process based on a user device location.
FIG. 4 is an example of an event data collecting process based on a user device travel direction.

As an example, the controller 102 may collect event data 114 based on how far away a user device 108 (e.g. a mobile phone) is from the space 122. For example, FIG. 3 illustrates a bird's eye view of the physical locations of a space 122 and a user device 108. In this example, the controller 102 may determine a physical location 302 of a user device 108 for a user. The physical location 302 of the user device 108 may be described using Global Positioning System (GPS) coordinates or any other suitable type of coordinate system. The controller 102 then determines a distance 306 (e.g. Euclidian distance) between the space 122 and the physical location 302 of the user device 108. The controller 102 compares the determined distance 306 between the space 122 and the user device 108 to a predetermined threshold value 308 that indicates a maximum distance away from the space 122 for the user to be associated with a present status. The predetermined threshold value 308 may set to three hundred feet, eight hundred feet, one mile, five miles, or any other suitable distance. When the controller 102 determines that the distance 306 is less than the predetermined threshold value 308, the controller 102 determines that the user is present in the space 122. In this case, the controller 102 sets an occupancy status 118 in the event data 114 to a "present" or "home" status. When the controller 102 determines that the distance 306 is greater than the predetermined threshold value 308, the controller 102 determines that the user is away from the space 122. In this case, the controller 102 sets an occupancy status 118 in the event data 114 to an away status. The controller 102 may also set a timestamp 116 in the event data 114 with the current time in response to setting the occupancy status 118. In this example, the collected event data 114 provides insight about when a user typically leaves and returns to a space 122.

Collecting Event Data Based on a User Device Travel Direction

As another example, the controller 102 may collect event data 114 based on a determined travel direction of a user device 108. For example, FIG. 4 illustrates a bird's eye view of the physical locations of a space 122 and a user device 108. In this example, the controller 102 may determine a first physical location 402 of a user device 108 at a first time instance. The controller 102 then determines a first distance 404 between the space 122 and the first physical location 402 of the user device 108. After some period of time, the controller 102 determines a second physical location 406 of the user device 108 at a second time instance. The controller 102 then determines a second distance 408 between the space 122 and the second physical location 406 of the user device 108. The controller 102 compares the first distance 404 at the first time instance to the second distance 408 at the second time instance to determine a travel direction for the user device 108 in relation to time. The controller 102 determines that the user device 108 is moving away from the space 122 when the second distance 408 is greater than the first distance 404. For example, this scenario may correspond with when a user is driving away from their home. In this case, the controller 102 determines that the user is leaving the space 122 and sets an occupancy status 118 in the event data 114 to an away status. The controller 102 determines that the user device 108 is moving towards the space 122 when the second distance 408 is less than the first distance 404. For example, this scenario may correspond with when a user is driving toward their home. In this case, the controller 102 determines that the user approaching the space 122 and sets an occupancy status 118 in the event data 114 to a present status. The controller 102 may also set a timestamp 116 in the event data 114 with the current time in response to setting the occupancy status 118. In this example, the collected event data 114 provides insight about when a user leaves and returns to a space 122 based on travel direction.

Collecting Event Data Based on Thermostat Interactions

As another example, the controller 102 may collect event data 114 based on a user's interactions with a thermostat 106. For instance, a user may interact with a thermostat 106 to provide a user input for a set point temperature. The user may interact with the thermostat 106 by physically interacting (e.g. touching) with the thermostat 106 or by virtually interacting with the thermostat 106 using a mobile application or web service. In this example, the controller 102 sets a timestamp 116 in the event data 114 with the current time in response to detecting that the user provided the user input to the thermostat 106. The controller 102 may set an occupancy status 118 in the event data 114 to a present status in response to detecting that the user provided the user input to the thermostat 106 by physically interacting with the thermostat 106. In this case, the controller 102 determines that the user was present in the space 122 based on their physical interaction with the thermostat 106 in the space 122. The controller 102 may set an occupancy status 118 in the event data 114 to an away status in response to detecting that the user provided the user input to the thermostat 106 by virtually interacting with the thermostat 106, for example via a web service (e.g. the Internet). In this case, the controller 102 may determine that the user was not present in the space 122 based on how the user connects to the thermostat 106. For instance, the controller 102 may determine that the user interacted with the thermostat 106 using an IP address or a WAN connection that is not associated with the space 122. The controller 102 may also identify a set point temperature based on the user input (e.g. a requested set point temperature) and set a set point temperature value 120 in the event data 114 to the identified set point temperature. In this example, the collected event data 114 provides insight about temperature preferences and when a user in present in a space 122 based on their interactions with a thermostat 106. In other examples, the controller 102 may use a similar process to collect information for predicting any other suitable type of indoor air parameter for the user. Examples of other indoor air parameters include, but are not limited to, humidity levels, Carbon Dioxide ($CO_2$) levels, or any other suitable type of parameter.

Collecting Event Data Based on Presence Detection

As another example, the controller 102 may collect event data 114 based on a user's interaction with a motion detector or proximity sensor located at the space 122. For instance, the controller 102 may receive a signal from a motion detector located at the space 122 in response to a user passing by the motion detector. The controller 102 determines that the user is present at the space 122 based on receiving the signal from the motion detector. The controller 102 may set a timestamp 116 in the event data 114 with the current time in response to detecting the user. The controller 102 may set an occupancy status 118 in the event data 114 to a present status in response to determining that the user is present in the space 122. In this example, the collected event data 114 provides insight about when a user is present in a space based detecting their presence within the space 122.

Collecting Event Data Based on Voice Commands

As another example, the controller 102 may collect event data 114 based on a user's interaction with a device 108 (e.g. home automation device) to control a thermostat 106. For instance, a user may use voice commands to instruct a home automation device 108 to set a set point temperature on a thermostat 106. The controller 102 determines that the user is present at the space 122 based on detecting that the user has issued the voice command to the home automation device 108 from within the space 122. The controller 102 may set a timestamp 116 in the event data 114 with the current time in response to detecting the user. The controller 102 may set an occupancy status 118 in the event data 114 to a present status in response to determining that the user is present in the space 122. In this example, the collected event data 114 provides insight about temperature preferences and when a user in present in a space 122 based on their interactions with a thermostat 106 using home automation devices.

Collecting Event Data Based on Network Connection Types

Figures 5, 6:
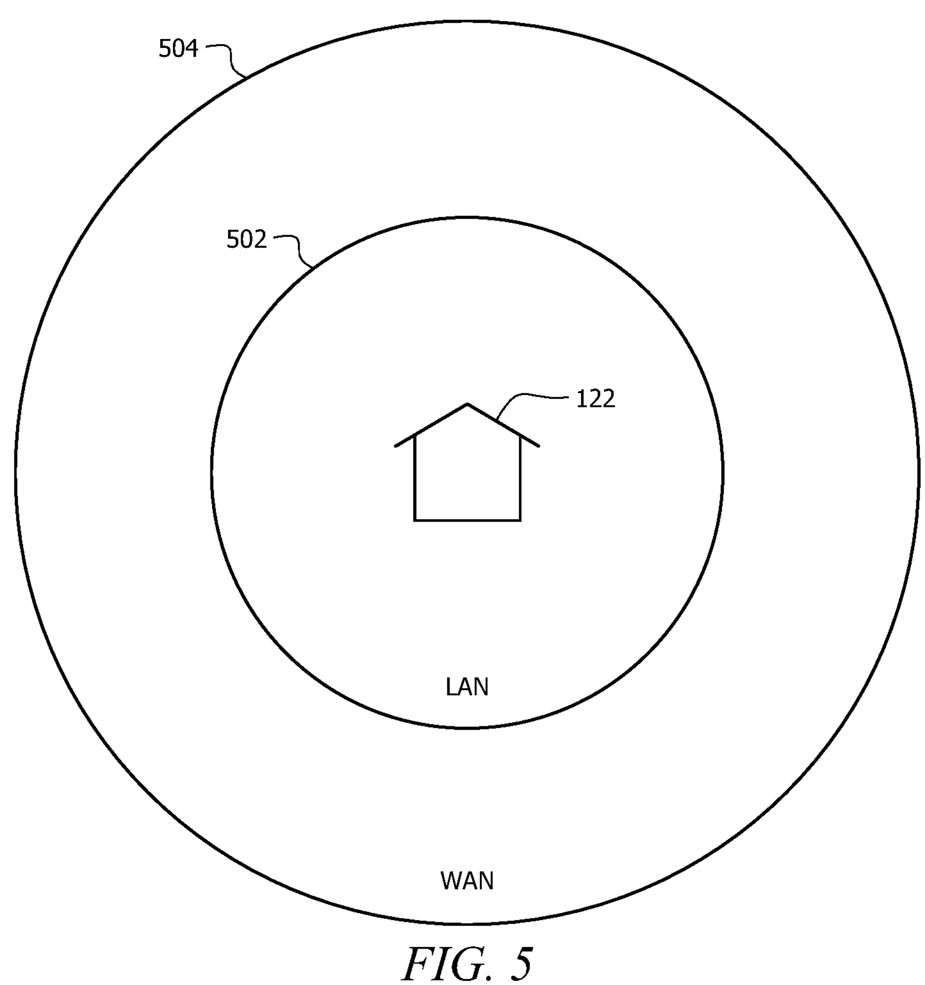
FIG. 5 is an example of an event data collecting process based on network connection types.
FIG. 6 is an example of an occupancy history log.

As another example, the controller 102 may collect event data 114 based on changes in a network connection type for a user device 108. For example, FIG. 5 illustrates a bird's eye view of different network connection types with respect to the physical location of a space 122. In FIG. 5, a user device 108 may be configured to use a network connection type corresponding with a LAN 502 that is associated with the space 122 or a network connection type corresponding with a WAN 504 that is not associated with the space 122. Examples of network connections for a LAN 502 that is associated with the space 122 include, but are not limited to, a WiFi network connection, a Bluetooth network connection, a Zigbee network connection, a Z-wave network connection, or any other suitable type of local network connection. Examples of network connections for a WAN 504 include, but are not limited to, a cellular network connection and a satellite network connection.

In this example, the controller 102 determines a first network connection type for a user device 108 at a first time instance and then determines a second network connection type for the user device 108 at a second time instance. For instance, the controller 102 may determine the second network connection type for the user device 108 after a predetermined amount of time has elapsed after the first time instance. The controller 102 then determines an occupancy status 118 based on changes between the first network connection type and the second network connection type. The controller 102 sets the occupancy status 118 to a present status when the first network connection type is associated with a WAN connection and the second network connection type is associated with a LAN connection for the space 122. This scenario corresponds with when a user approaches the space 122 and is close enough to switch from a WAN connection to a LAN connection for the space 122. The controller 102 sets the occupancy status 118 to an away status when the first network connection is associated with a LAN connection for the space 122 and the second network connection is associated with a WAN connection. This scenario corresponds with when a user is leaving the space 122 and has to connect to a WAN connection because they are too far away to stay connected to the LAN connection for the space 122. The controller 102 may also set a timestamp 116 in the event data 114 with the current time in response to setting the occupancy status 118. In this example, the collected event data 114 provides insight about when a user in present in a space 122 based on changes in the network connection types.

Collecting Event Data Based on a LAN Connection

As another example, the controller 102 may collect event data 114 based on whether a user device 108 for a user is connected to a LAN 502 that is associated with a space 122. In this example, the controller 102 may identify one or more devices 108 that are currently connected to a LAN 502 for a space 122. The controller 102 may use a device identifier (e.g. a MAC address and/or an IP address) to determine whether a particular user device 108 for a user is among the one or more devices 108 that are currently connected to the LAN 502 for the space 122. In other words, the controller 102 checks to see whether a particular user device 108 is connected to the LAN 502 to determine whether the user is present in the space 122. The controller 102 sets the occupancy status 118 in the event data 114 to a present status when the controller 102 determines that the user device 108 is present among the devices 108 that are currently connected to the LAN 502. The controller 102 sets the occupancy status 118 in the event data 114 to an away status when the controller 102 determines that the user device 108 is not present among the devices 108 that are currently connected to the LAN 502. In this example, the collected event data 114 provides insight about temperature preferences and when a user in present in a space 122 based on detecting their presence using a LAN connection that is associated with the space 122.

Returning to FIG. 2 at step 204, the controller 102 populates an occupancy history log 602 (illustrated in FIG. 6) with the event data 114 collected in step 202. Here, the controller 102 uses received event data 114 to fill in time entries 604 in an occupancy history log 602. The occupancy history log 602 describes the observed user behavior and preferences based on the collected event data 114. Referring to FIG. 6 as an example, an occupancy history log 602 comprises a plurality of time entries 604 that are ordered chronologically. Each time entry 604 may comprise a timestamp 116, a set point temperature 120, an occupancy status 118, and/or any other suitable type of information. In this example, the timestamps 116 indicate an hour of a day. In other examples, the timestamps 116 may indicate a day of the week, a minute of the day, or any other suitable timing information. The controller 102 uses timestamps 116 from the event data 114 to identify a corresponding timestamp 116 in the occupancy history log 602 to fill in a time entry 604 with event data 114. For example, the controller 102 may determine an event data 114 has a timestamp 116 that corresponds with 1:00 pm. The controller 102 identifies a time entry 604 in the occupancy history log 602 that corresponds with 1:00 pm and populates the time entry 604 with the event data 114. In this example, the occupancy history log 602 uses Boolean values to indicate a present status or an away status. For instance, a Boolean value of one corresponds with a present status, and a Boolean value of zero corresponds with an away status.

Returning to FIG. 2 at step 206, the controller 102 determines whether there are any blank time entries 604 in the occupancy history log 602. For example, the collected event data 114 may be sparse data that does not provide information for every hour of the day. This means that after the controller 102 populates the occupancy history log 602 there may be time entries 604 that are unfilled or partially filled. For instance, one or more time entries 604 may contain timestamps 116 and occupancy statuses 118 but may not have a set point temperature value 120. In some instances, one or more time entries 604 may not have any information. This may occur when the controller 102 is unable to collect event data 114 at various time of the day. Here, the controller 102 determines whether any of the time entries 604 are missing information and are blank or at least partially blank.

The controller 102 may terminate method 200 in response to determining that there are no blank time entries 604 in the occupancy history log 602. In this case, the controller 102 determines that the occupancy history log 602 has been filled in completely and is ready to be used for other processes. The controller 102 proceeds to step 208 in response to determining that there are blank time entries 604 in the occupancy history log 602. In this case, the controller 102 proceeds to step 208 to begin the process of filling in any missing information for time entries 604 in the occupancy history log 602.

At step 208, the controller 102 identifies blank time entries 604 in the occupancy history log 602. Here, the controller 102 identifies any of the time entries 604 that are missing at least some information. At step 210, the controller 102 populates the blank time entries 604 in the occupancy history log 602 by forward filling the blank time entries 604 with the most recent event data 114. For example, the controller 102 may determine that a time entry 604 is missing a set point temperature value and an occupancy status. The controller 102 may use the set point temperature value and the occupancy status from a preceding time entry 604 to fill in the missing set point temperature value and occupancy status. As an example, the controller 102 may use values from a time entry 604 for 12:00 pm to fill a time entry 604 for 1:00 pm.

After the controller 102 fills in any blank time entries 604, the controller 102 may store the completed occupancy history log 602 in memory (e.g. memory 1604) or may use the completed occupancy history log 602 to generate a machine learning model 112 using a process similar to the process described below in FIG. 7.

Predictive Presence Scheduling Process

Figures 7, 8:
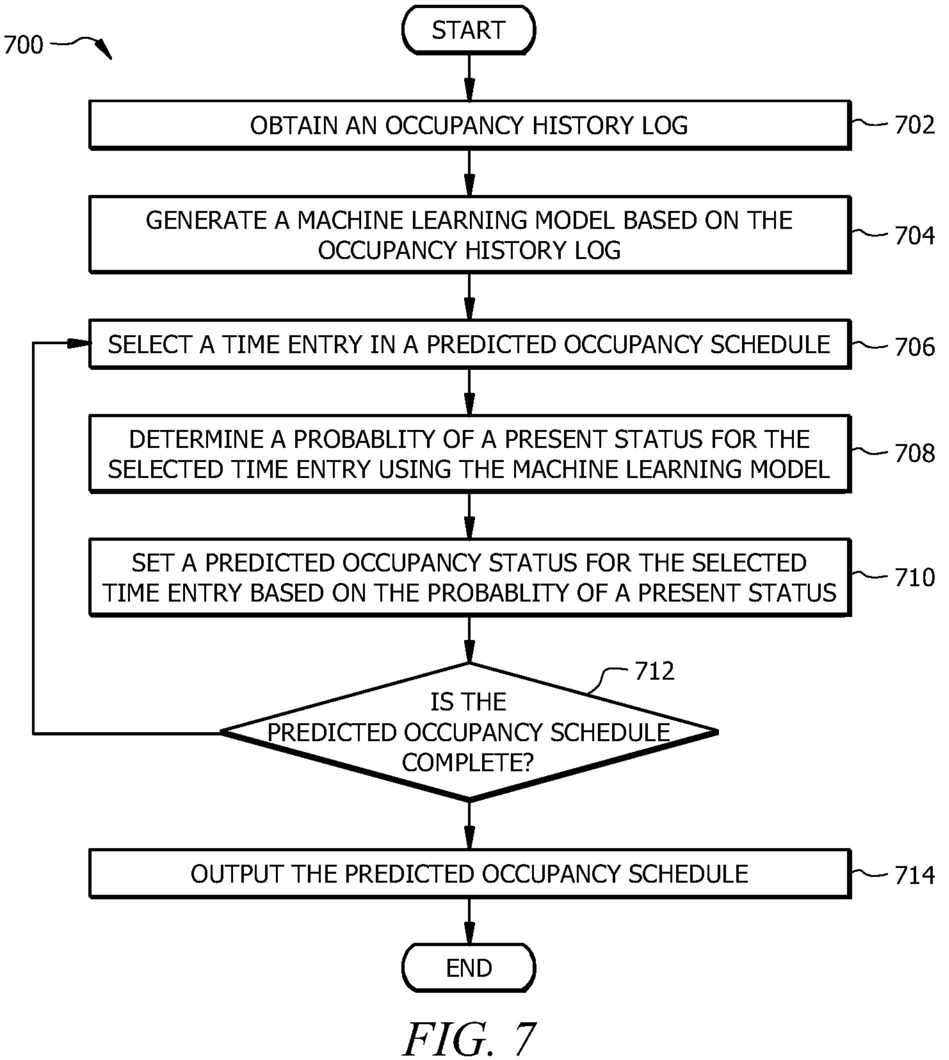
FIG. 7 is a flowchart of an embodiment of a predictive presence scheduling method for an HVAC system.
FIG. 8 is an example of a portion of a machine learning model for predicting whether a user will be present.

FIG. 7 is a flowchart of an embodiment of a predictive presence scheduling method 700 for an HVAC system 104. The controller 102 may employ method 700 to generate a predicted occupancy schedule 110 that predicts whether a home owner will be home or away at various times of the day. The controller 102 can then use the predicted occupancy schedule 110 to control the HVAC system 104 to provide energy savings by adjusting the set point temperature while the home owner is away.

At step 702, the controller 102 obtains an occupancy history log 602. For example, the controller 102 may obtain the occupancy history log 602 from memory (e.g. memory 1604) or from a process similar to the process described above in FIG. 2. The occupancy history log 602 comprises a plurality of occupancy statuses 118 over a predetermined amount of time. In some embodiments, the controller 102 may reformat the occupancy history log 602 into a suitable format for generating a machine learning model 112. For example, the occupancy history log 602 may contain occupancy statuses 118 that are associated with minutes of day instead of hours of day. In this example, the controller 102 may reformat the occupancy history log 602 to associate the occupancy statuses 118 with hours of the day. For instance, the controller 102 may determine which occupancy status 118 occurs most frequently with an hour. The controller 102 may then associate the hour with an occupancy status 118 that occurred most frequently. In other embodiments, the controller 102 reformat the occupancy history log 602 using any other suitable technique.

At step 704, the controller 102 generates a machine learning model 112 based on the occupancy history log 602. In one embodiment, the controller 102 may analyze the occupancy history log 602 to determine whether it contains enough data (e.g. occupancy statuses 118) for generating a machine learning model 112. The accuracy of a machine learning model 112 depends on the quality and the quantity of data that is used to train the machine learning model 112. This means that the accuracy of a machine learning model 112 will degrade when there is inaccurate training data or an insufficient amount of training data. For this reason, the controller 102 may determine a number of occupancy statuses 118 in the occupancy history log 602. The controller 102 may then compare the number of occupancy statuses 118 to a predetermined threshold value that corresponds with a minimum number of occupancy statuses 118 for generating a machine learning model 112. The controller 102 may terminate method 200 when the number of occupancy statuses 118 is less than the predetermined threshold value. In this case, the controller 102 determines that the occupancy history log 602 does not contain a sufficient amount of data for generating a machine learning model 112. Otherwise, the controller 102 may proceed to generate a machine learning model 112 when the number of occupancy statuses 118 is greater than the predetermined threshold value. In this case, the controller 102 determines that the occupancy history log 602 contains a sufficient amount of data for generating a machine learning model 112.

In one embodiment, the controller 102 generates a machine learning model 112 by performing a regression analysis using the data from the occupancy history log 602 to train a set of weights for the machine learning model 112. For example, the machine learning model 112 may be represented as a linear or a non-linear function that includes a plurality of weights. At least a portion of the occupancy history log 602 is used as training data to adjust weights, biases, or any other machine learning model parameters while training and generating the machine learning model 112. For example, the controller 102 may perform a regression analysis using the occupancy history log 602 to determine a first set of weights for a machine learning model 112 that are associated with a day of the week. The controller 102 may also use the occupancy history log 602 to determine a second set of weights for the machine learning model 112 that are associated with a time of a day. For example, FIG. 8 shows an example of weights 802 for a machine learning model 112. In this example, weights 802A, 802B, and 802C are weights 802 that are associated with a day of the week (e.g. Monday, Tuesday, and Wednesday) and weights 802D and 802E are weights 802 associated with a time of the day (e.g. 1:00-2:00 pm and 2:00-3:00 pm). Each weight 802 is multiplied by a variable 806 that corresponds with a day of the week (e.g. $D_{mon}$, $D_{tue}$, and $D_{wed}$), a time of the day (e.g. $TS_{1\text{-}2\ PM}$ and $TS_{2\text{-}3\ PM}$), a temperature (e.g. a set point temperature), a humidity level, a $CO_2$ level, or any other type of input. This variable 806 can be used to select weights 802 for computing a probability 804. An example of this process is described below in step 708. Training the machine learning model 112 allows it to determine a probability 804 for whether a user will be present at a space 122 based on a day of the week and a time of the day. For example, the controller 102 can use the machine learning model 112 to determine a probability 804 for whether a user will be home at 2:00 pm on a Wednesday. In some cases, a different portion of the occupancy history log 602 than the portion that is used for training the machine learning model 112 may be used as validation data for testing the accuracy of the generated machine learning model 112.

In one embodiment, the controller 102 may also use historical weather information to generate the machine learning model 112. For example, the controller 102 may obtain historical weather information and determine a third set of weights 802 for the machine learning model 112 that are associated with a temperature (e.g. a set point temperature) at a time of a day. For instance, the controller 102 may access or request historical weather information from a weather repository or database. The historical weather information may comprise previous local weather temperatures at various times of the year. The historical weather information may contain previous weather information for the previous month, the previous year, or from any other suitable time period. In this example, the machine learning model 112 may be configured to also use a forecasted weather temperature as an input. For example, the controller 102 also access or request forecasted weather information from a weather repository or database. The forecasted weather information comprises predicted local weather temperatures. The forecasted weather information may contain forecasted weather information for the next day, the next week, or any other suitable time period. In other examples, the controller 102 may use any other suitable type or combination of data to generate a machine learning model 112.

Figures 9, 10:
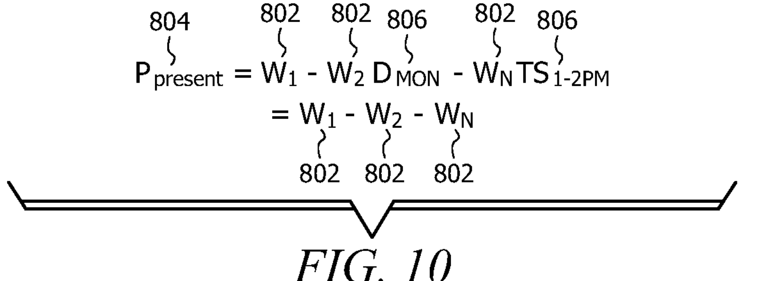
FIG. 9 is an example of a predicted occupancy schedule.
FIG. 10 is an example of a process for determining an occupancy status using a machine learning model.

Returning to FIG. 7 at step 706, the controller 102 selects a time entry 902 in a predicted occupancy schedule 110. Referring to FIG. 9 as an example, the predicted occupancy schedule 110 comprises a plurality of time entries 902 that each correspond with a day of the week and a time of the day. The controller 102 may iteratively select time entries 902 from the predicted occupancy schedule 110 to begin filling in time entries 902 with a predicted occupancy status 904. For example, the predicted occupancy schedule 110 indicates that space 122 is occupied at 7 am on Tuesday (as indicated by the "1" in the corresponding entry 902), but not occupied at 8 am on Tuesday (as indicated by the "0" in the corresponding entry 902). Furthermore, the predicted occupancy schedule 110 indicates that space 122 is again occupied at 6 pm on Tuesday. This predicted occupancy schedule 110 therefore demonstrates a pattern of non-occupancy of the space 122 from 8 am through 6 pm on Tuesday, which may be indicative of a user that works away from the home during normal daytime work hours. In contrast, the predicted occupancy indicates that space 122 is occupied all day on both Saturday and Sunday, which demonstrates a pattern of occupancy of the space 122 that may be indicative of a user that stays home on the weekends.

Returning to FIG. 7 at step 708, the controller 102 determines a probability 804 of a present status for the selected time entry 902 using the machine learning model 112. Referring to FIG. 10 as an example, the controller 102 may use Boolean values to select the weights 802 for computing the probability 804 of a present status for the selected time entry 902 using the machine learning model 112 described in FIG. 8. Previously in FIG. 8, each weight 802 is multiplied by a variable 806 (e.g. $D_{mon}$) that corresponds with a day of the week, a time of the day, a temperature, or any other type of input. By setting a variable 806 to either a "1" or a "0," the controller 102 can select weights 802 for determining a probability 804. Setting a variable to "0" multiplies a weight 802 by zero and effectively removes the weight 802 from a probability calculation. Setting a variable to "1" multiples a weight 802 by one and preserves the weight 802 for a probability calculation. As an example, the selected time entry 902 may correspond with Monday at 1:00-2:00 pm. In this example, the controller 102 may use a Boolean value of one to select the variables for the weights 802 corresponding with Monday at 1:00-2:00 pm. The controller 102 may use a Boolean value of zero to ignore weights 802 corresponding with other days and times. FIG. 10 illustrates the remaining weights 802 after selecting the appropriate weights 802 using Boolean values. The controller 102 then determines the probability 804 that the user in present at the space 122 for the selected time entry 902 using the remaining weights 802 similar to as shown in FIG. 10.

Returning to FIG. 7 at step 710, the controller 102 sets a predicted occupancy status 904 for the selected time entry 902 based on the probability 804 of a present status. In one embodiment, the controller 102 sets a predicted occupancy status 904 to a present status when the machine learning model 112 outputs a probability 804 that is greater than or equal to 50%. In other examples, the controller 102 may set the predicted occupancy status 904 to a present status when the machine learning model 112 outputs a probability 804 that is greater than or equal 60%, 75%, or any other suitable percentage. Returning to the example in FIG. 9, the controller 102 may use a Boolean value to indicate a predicted occupancy status 904 for a particular time slot 902. In this example, a Boolean value of one corresponds with a present status (i.e. the user is home) and a Boolean value of zero corresponds with an away status (i.e. the user is away). In other examples, the controller 102 may use any other suitable value to represent a present status and an away status. In some embodiments, the controller 102 may also associate the selected time entry 902 with a confidence level that corresponds with the probability 804 for the predicted occupancy status 904.

In some embodiments, the controller 102 may also associate the selected time entry 902 with a heating set point temperature and/or a cooling set point temperature. A heating set point temperature is a predicted set point temperature for a space 122 when an HVAC system 104 is operating in a heating mode. A cooling set point temperature is a predicted set point temperature for a space 122 when an HVAC system 104 is operating in a cooling mode. The controller 102 may determine a cooling set point temperature or a heating set point temperature based on the occupancy history log 602. For example, the controller 102 may identify a cooling set point temperature or a heating set point temperature from the occupancy history log 602 that corresponds with the selected time entry 902. For example, the controller 102 may select a time entry 902 that corresponds with Friday at 7:00 pm. The controller 102 may look for set point temperatures in the occupancy history log 602 that correspond with Friday at 7:00 pm. The controller 102 uses the information from the occupancy history log 602 to determine what set point temperature the user typically prefers at this time and then associates the determined set point temperature with the selected time entry 902.

Returning to FIG. 7 at step 712, the controller 102 determines whether the predicted occupancy schedule 110 is complete. Here, the controller 102 determines whether a predicted occupancy status 904 has been set for all of the time entries 902 in the predicted occupancy schedule 110. The controller 102 determines that the predicted occupancy schedule 110 is incomplete when one or more time entries 902 do not have a predicted occupancy status 904. The controller 102 determines that the predicted occupancy schedule 110 is complete when all of the time entries 902 have a predicted occupancy status 904. The controller 102 returns to step 706 in response to determining that the predicted occupancy schedule 110 is not complete. Here, the controller 102 returns to step 706 to select another time entry 902 from the predicted occupancy schedule 110 to fill in with a predicted occupancy status 904. Otherwise, the controller 102 proceeds to step 714 in response to determining that the predicted occupancy schedule 110 is complete.

At step 714, the controller 102 outputs the completed predicted occupancy schedule 110. In one embodiment, the controller 102 may output the predicted occupancy schedule 110 by storing the predicted occupancy schedule 110 in a memory (e.g. memory 1604). In one embodiment, the controller 102 may output the completed predicted occupancy schedule 110 by presenting the predicted occupancy schedule 110 to a user on a graphical user interface. In this example, the controller 102 may present the predicted occupancy schedule 110 to a user to confirm whether the user accepts the predicted occupancy schedule 110. In the event that the user does not accept the predicted occupancy schedule 110, the controller 102 may repeat the process described in method 700 using a different set of training data (e.g. a different portion of the occupancy history log 602) to generate a different predicted occupancy schedule 110.

In one embodiment, the controller 102 may output the predicted occupancy schedule 110 by using the predicted occupancy schedule 110 to control an HVAC system 104. For example, the controller 102 or the thermostat 106 may use the predicted occupancy schedule 110 for setting present and away statuses and/or for controlling a set point temperature for an HVAC system 104 based on predicted occupancy statuses 904.

Predictive Temperature Scheduling Process

Figure 11:
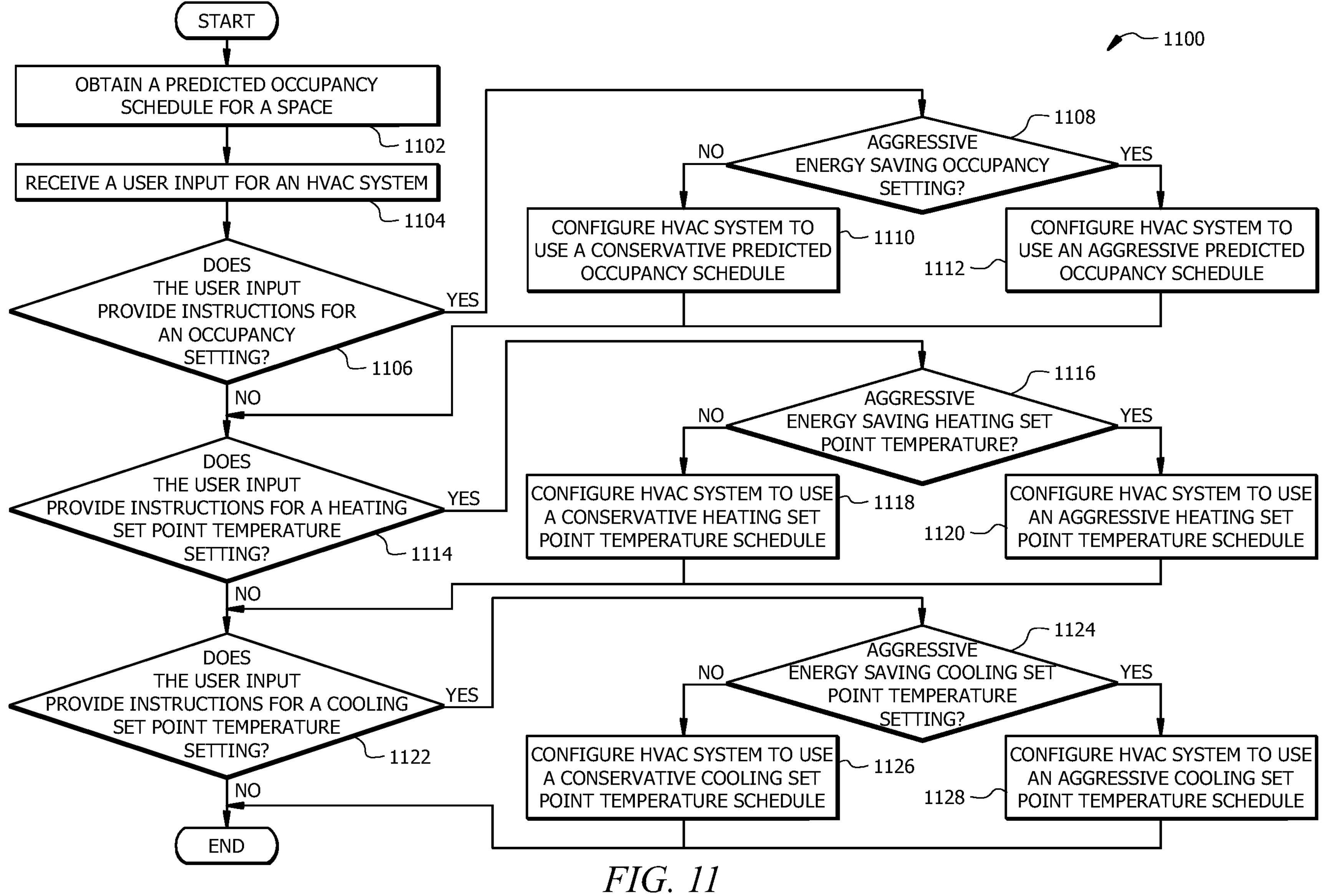
FIG. 11 is a flowchart of an embodiment of a predictive temperature scheduling method for an HVAC system.

FIG. 11 is a flowchart of an embodiment of a predictive temperature scheduling method 1100 for an HVAC system 104. The controller 102 may employ method 1100 to update a predicted occupancy schedule 110 to use conservative or aggressive energy saving settings for controlling the HVAC system 104. The controller 102 may adjust occupancy statuses and/or set point temperatures in the predicted occupancy schedule 110 to improve energy saving benefits. For example, the controller 102 may update a predicted occupancy schedule 110 to increase a cooling set point temperature to reduce the amount of energy consumed by the HVAC system 104. The controller 102 uses historical information for a user for adjusting a set point temperature which allows the controller 102 to select a suitable set point temperature that reduces energy consumption while keeping the user comfortable.

At step 1102, the controller 102 obtains a predicted occupancy schedule 110 for a space 122. For example, the controller 102 may obtain a predicted occupancy schedule 110 from memory (e.g. memory 1604) or from the process described above in FIG. 7. The predicted occupancy schedule 110 comprises a plurality of time entries 902 that are each associated with a day of the week and an hour of a day. Each time entry 902 may be associated with a predicted occupancy status 904 (e.g. a present status or an away status), a heating set point temperature, a cooling set point temperature, a confidence level for the predicted occupancy status 904, a confidence level for a heating set point temperature, and/or a confidence level for a cooling set point temperature.

At step 1104, the controller 102 receives a user input for an HVAC system 104. In one embodiment, the user may provide a user input by physically or virtually interacting with a thermostat 106 and/or the controller 102. The user input may comprise instructions for an occupancy setting, a heating set point temperature setting, and/or a cooling set point temperature setting. For example, the user input may comprise an occupancy setting that indicates whether the user wants to configure the HVAC system 104 to use conservative or aggressive energy saving occupancy settings. When the HVAC system 104 is configured for a conservative energy saving occupancy setting, the controller 102 may assume that a user is home when the controller 102 is uncertain about an occupancy status 118 for the space 122. When the HVAC system 104 is configured for an aggressive energy saving occupancy setting, the controller 102 may assume that the user is away when the controller 102 is uncertain about an occupancy status 118 for the space 122.

As another example, the user input may comprise a heating setting (e.g. a heating set point temperature setting) that indicates whether the user wants to configure the HVAC system 104 to use conservative or aggressive heating set point temperature settings. When the HVAC system 104 is configured for a conservative heating set point temperature setting, the controller 102 may use the highest historical heating set point temperature for the space 122 as the set point temperature for the space 122. When the HVAC system 104 is configured for an aggressive heating set point temperature setting, the controller 102 may use the lowest historical heating set point temperature for the space 122 as the set point temperature for the space 122.

As another example, the user input may comprise a cooling setting (e.g. a cooling set point temperature setting) that indicates whether the user wants to configure the HVAC system 104 to use conservative or aggressive cooling set point temperature settings. When the HVAC system 104 is configured for a conservative cooling set point temperature setting, the controller 102 may use the lowest historical cooling set point temperature for the space 122 as the set point temperature for the space 122. When the HVAC system 104 is configured for an aggressive cooling set point temperature setting, the controller 102 may use the highest historical cooling set point temperature for the space 122 as the set point temperature for the space 122.

At step 1106, the controller 102 determines whether the user input provides instructions for an occupancy setting. The controller 102 proceeds to step 1108 in response to determining that the user input provides instructions for an occupancy setting. At step 1108, the controller 102 determines whether the user input indicates an aggressive energy saving occupancy setting. The controller 102 proceeds to step 1110 in response to determining that the user input does not indicate an aggressive energy saving occupancy setting. In other words, the controller 102 proceeds to step 1110 in response to determining that the user input indicates a conservative energy saving occupancy setting.

At step 1110, the controller 102 configures the HVAC system 104 to use a conservative predicted occupancy schedule 110. In this case, the controller 102 may identify time entries 902 in the predicted occupancy schedule 110 that are associated with a confidence level that is less than a predetermined threshold value. The predetermined threshold value corresponds with a minimum confidence level for the controller 102 to be confident with the predicted occupancy status 904. The controller 102 may modify or set the predicted occupancy statuses 904 for the time entries 902 that are associated with a confidence level that is less than the predetermined threshold to a present status. In this configuration, the controller 102 may assume that a user is home when the controller 102 is uncertain about an occupancy status 118 for the space 122. Execution then proceeds to step 1114.

Returning to step 1108, the controller 102 proceeds to step 1112 in response to determining that the user input indicates an aggressive energy saving occupancy setting. At step 1112, the controller 102 configured the HVAC system 104 to use an aggressive predicted occupancy schedule 110. In this case, the controller 102 may identify time entries 902 in the predicted occupancy schedule 110 that are associated with a confidence level that is less than the predefined threshold value that was described in step 1110. The controller 102 may modify or set the predicted occupancy statuses 904 for the time entries 902 that are associated with a confidence level that is less than the predetermined threshold to an away status. In this configuration, the controller 102 may assume that a user is away when the controller 102 is uncertain about an occupancy status 118 for the space 122. Execution then proceeds to step 1114.

Returning to step 1106, execution proceeds to step 1114 in response to determining that the user input does not provide instructions for an occupancy setting. At step 1114, the controller 102 determines whether the user input provides instructions for a heating set point temperature setting. The controller 102 proceeds to step 1116 in response to determining that the user input provides instructions for a heating set point temperature setting. At step 1116, the controller 102 determines whether the user input indicates an aggressive energy saving heating set point temperature setting. The controller 102 proceeds to step 1118 in response to determining that the user input does not indicate an aggressive energy saving heating set point temperature setting. In other words, the controller 102 proceeds to step 1118 in response to determining that the user input indicates a conservative energy saving heating set point temperature setting.

Figure 12:
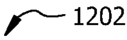
FIG. 12 is an example of historical set point temperatures for a space.
Figure 12:
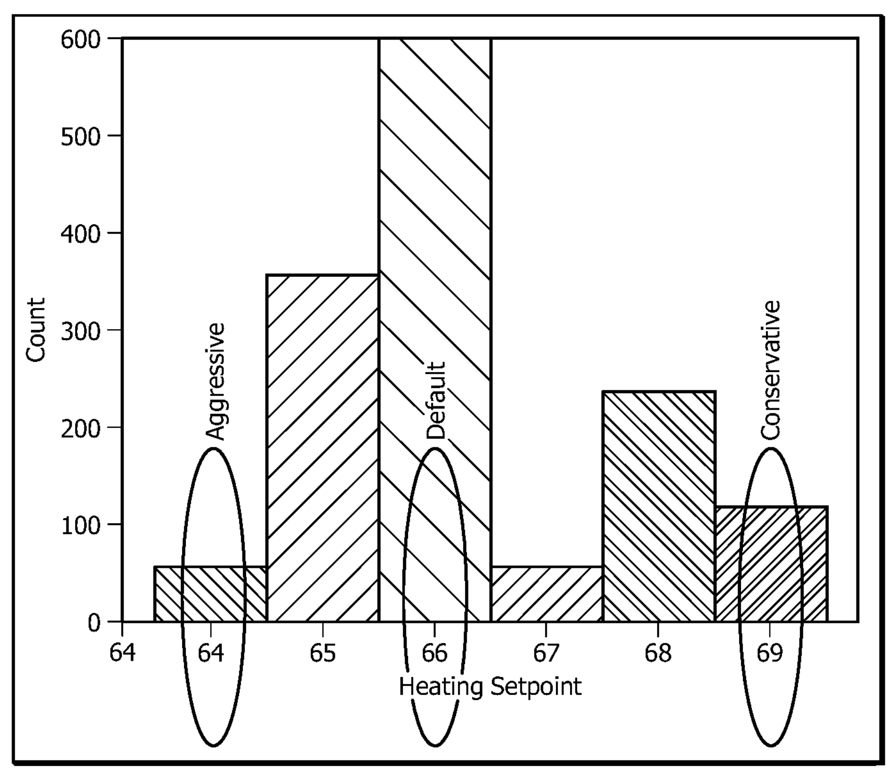

At step 1118, the controller 102 configured the HVAC system 104 to use a conservative heating set point temperature schedule. In this case, the controller 102 obtains historical set point temperature information 1202 for the space 122. Historical set point temperature information 1202 may comprise a log or history of heating set point temperatures and cooling set point temperatures for a space 122 over some period of time (e.g. weeks, months, or years). For example, FIG. 12 illustrates a histogram for a range of heating set point temperatures for a space 122 and the number of instances that a heating set point temperature was used over some period of time. The controller 102 identifies the highest heating set point temperature from among the range of heating set point temperatures for the space 122. In this example, the controller 102 selects a heating set point temperature of sixty-nine degrees. The controller 102 then identifies time entries 902 in the predicted occupancy schedule 110 that are associated with a heating set point temperature confidence level that is less than a predetermined threshold value. The controller 102 modifies or sets the identified time entries 902 to use the identified highest heating set point temperature. In this configuration, the controller 102 configured the HVAC system 104 to use a conservative heating set point temperature that is still within the range of suitable temperatures for the space 122. Execution then proceeds to step 1122 of FIG. 11.

Returning to FIG. 11 at step 1116, the controller 102 proceeds to step 1120 in response to determining that the user input indicates an aggressive energy saving heating set point temperature setting. At step 1120, the controller 102 configured to the HVAC system 104 to use an aggressive heating set point temperature schedule. In this case, the controller 102 obtains historical set point temperature information 1202 for the space 122. Referring again to FIG. 12 as an example, the controller 102 identifies the lowest heating set point temperature from among the range of heating set point temperatures for the space 122. In this example, the controller 102 selects a heating set point temperature of sixty-four degrees. The controller 102 then identifies time entries 902 in the predicted occupancy schedule 110 that are associated with a heating set point temperature confidence level that is less than a predetermined threshold value. The controller 102 modifies or sets the identified time entries 902 to use the identified lowest heating set point temperature. In this configuration, the controller 102 configured the HVAC system 104 to use an aggressive heating set point temperature that is still within the range of suitable temperatures for the space 122. Execution then proceeds to step 1122.

Returning to FIG. 11 at step 1114, execution proceeds to step 1122 in response to determining that the user input does not provide instructions for a heating set point temperature setting. At step 1122, the controller 102 determines whether the user input provides instructions for a cooling set point temperature setting. The controller 102 proceeds to step 1124 in response to determining that the user input provides instructions for a cooling set point temperature setting. At step 1124, the controller 102 determines whether the user input indicates an aggressive energy saving cooling set point temperature setting. The controller 102 proceeds to step 1126 in response to determining that the user input does not indicate an aggressive energy saving cooling set point temperature setting. In other words, the controller 102 proceeds to step 1118 in response to determining that the user input indicates a conservative energy saving cooling set point temperatures setting.

Figure 13:
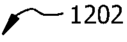
FIG. 13 is another example of historical set point temperatures for a space.
Figure 13:
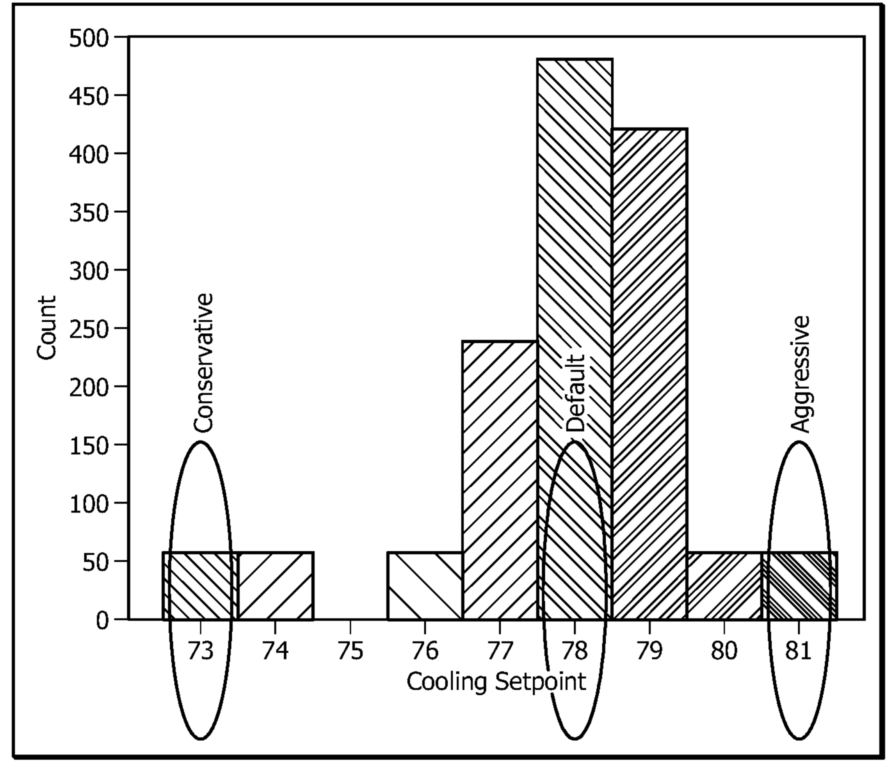

At step 1126, the controller 102 configures the HVAC system 104 to use a conservative cooling set point temperature setting. In this case, the controller 102 obtains historical set point temperature information 1202 for the space 122. For example, FIG. 13 illustrates a histogram for a range of cooling set point temperatures for a space 122 and the number of instances that a cooling set point temperature was used over some period of time. The controller 102 identifies the lowest cooling set point temperature from among the range of cooling set point temperatures for the space 122. In this example, the controller 102 selects a cooling set point temperature of seventy-three degrees. The controller 102 then identifies time entries 902 in the predicted occupancy schedule 110 that are associated with a cooling set point temperature confidence level that is less than a predetermined threshold value. The controller 102 modifies or sets the identified time entries 902 to use the identified lowest cooling set point temperature. In this configuration, the controller 102 configured the HVAC system 104 to use a conservative cooling set point temperature that is still within the range of suitable temperatures for the space 122.

Returning to FIG. 11 at step 1124, the controller 102 proceeds to step 1128 in response to determining that the user input indicates an aggressive energy saving cooling set point temperature setting. At step 1128, the controller 102 configures the HVAC system 104 to use an aggressing cooling set point temperature setting. In this case, the controller 102 obtains historical set point temperature information 1202 for the space 122. Referring again to FIG. 13 as an example, the controller 102 identifies the highest cooling set point temperature from among the range of cooling set point temperatures for the space 122. In this example, the controller 102 selects a cooling set point temperature of eighty-one degrees. The controller 102 then identifies time entries 902 in the predicted occupancy schedule 110 that are associated with a cooling set point temperature confidence level that is less than a predetermined threshold value. The controller 102 modifies or sets the identified time entries 902 to use the identified highest cooling set point temperature. In this configuration, the controller 102 configured the HVAC system 104 to use an aggressive cooling set point temperature that is still within the range of suitable temperatures for the space 122.

In one embodiment, the controller 102 may output the modified predicted occupancy schedule 110 by storing the modified predicted occupancy schedule 110 in a memory (e.g. memory 1604). In one embodiment, the controller 102 may output the modified predicted occupancy schedule 110 by presenting the modified predicted occupancy schedule 110 to a user on a graphical user interface. In this example, the controller 102 may present the modified predicted occupancy schedule 110 to a user to confirm whether the user accepts the modified predicted occupancy schedule 110.

In one embodiment, the controller 102 may output the modified predicted occupancy schedule 110 by using the modified predicted occupancy schedule 110 to control an HVAC system 104. For example, the controller 102 or the thermostat 106 may use the modified predicted occupancy schedule 110 for setting present and away statuses and/or for controlling a set point temperature for an HVAC system 104 based on modified predicted occupancy statuses 904. At this point, execution terminates.

Figure 14:
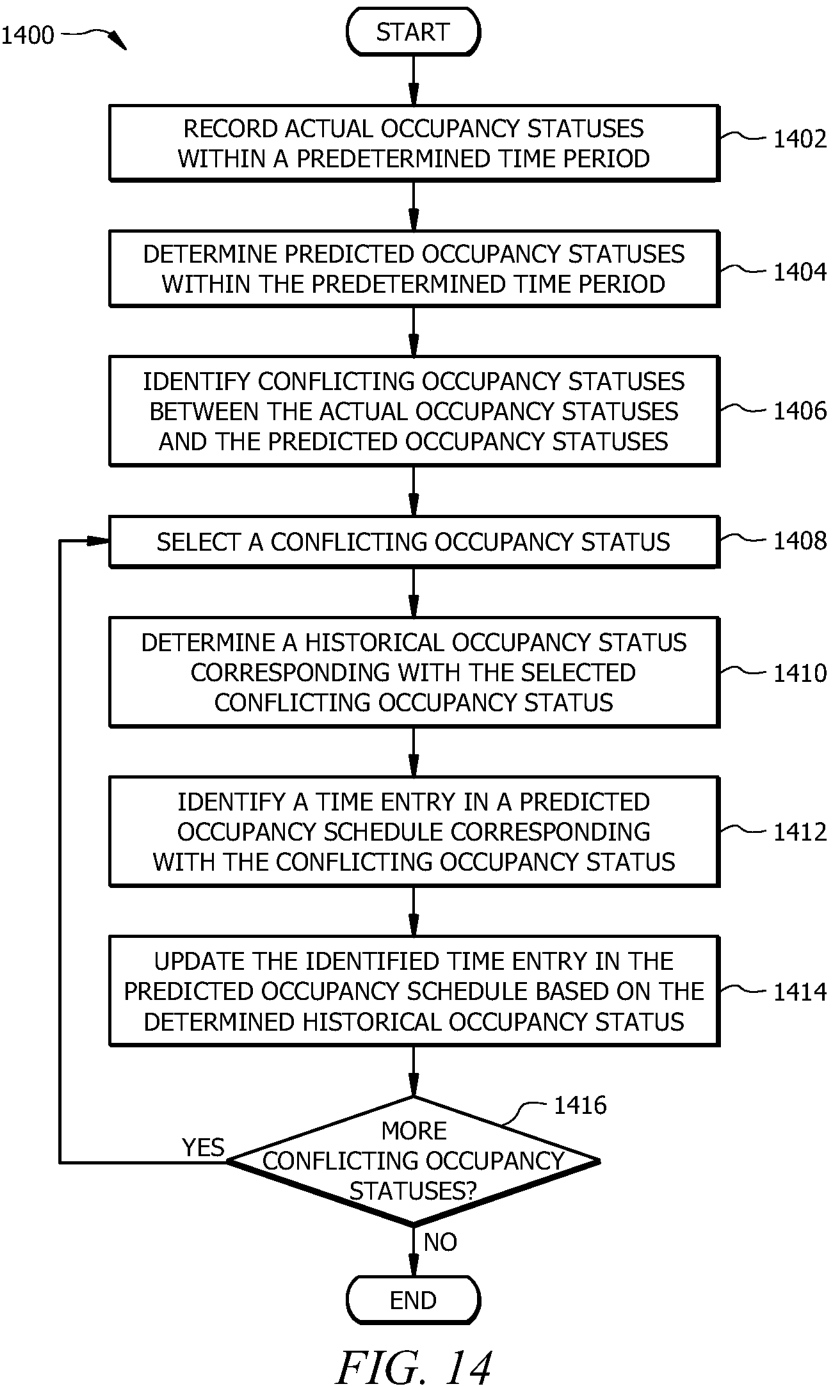
FIG. 14 is a flowchart of an embodiment of a predictive schedule error correction method for an HVAC system.

Error Correction Process FIG. 14 is a flowchart of an embodiment of a predictive schedule error correction method 1400 for an HVAC system 104. The controller 102 may employ method 1400 to periodically compare predicted occupancy statuses and set point temperatures to actual occupancy statuses and set point temperatures to determine how accurately a predicted occupancy schedule 110 follows the actual behavior of a user. The controller 102 employs method 1400 to provide error correction to update the predicted occupancy schedule 110 when the predicted occupancy schedule 110 is deviating from the actual behavior of a user.

Figure 15:
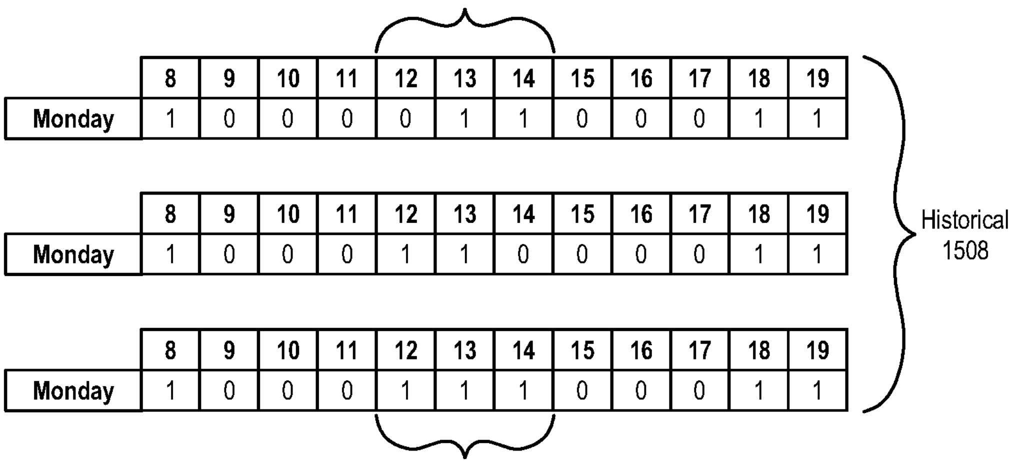
FIG. 15 is an example of a process for identifying conflicting occupancy statuses.

At step 1402, the controller 102 records actual occupancy statuses 1502 within a predetermined time period. For example, the controller 102 may keep a log of when a user is actually present or away from the space 122 over the past three weeks. In other examples, the controller 102 may record when a user is actually present or away from the space 122 over the past week, the past month, the past two months, or any other suitable time period. For example, FIG. 15 illustrates actual occupancy statuses 1502 for a user on a Monday between 8:00 am and 7:00 pm.

In some embodiments, the controller 102 may be configured to determine whether the forecasted local weather over the predetermined time period will be similar to the weather historically over this same time period before recording actual occupancy statuses 1502. The controller 102 may terminate method 1400 when the forecasted weather is expected to deviate from normal weather behavior because a user's behavior may deviate during these conditions. As an example, the controller 102 may obtain forecasted weather information for a location that is associated with a space 122. The forecasted weather information identifies forecasted weather temperatures for one or more days. The controller 102 also obtains historical weather information for the location associated with the space 122 for the same time period from previous years. The controller 102 compares the forecasted weather information to the historical weather information to determine a temperature difference. For instance, if the forecasted high temperature for Monday is eighty degrees and the historical high temperature for Monday at the same time of the year is eighty-two degrees, then the controller 102 may determine a temperature difference of two degrees between the forecasted weather information and the historical weather information. The controller 102 may then compare the determined temperature difference to a predefined temperature range to determine whether the forecasted weather is within a suitable temperature range before proceeding to step 1404. The predefined temperature range may be two degrees, three degrees, five degrees, or any other suitable temperature range. In some embodiments, the controller 102 may also consider rain, snow, or any other suitable weather condition before recording actual occupancy statuses 1502. For example, the controller 102 may determine to terminate method 1400 when rain or snow are forecasted.

Returning to FIG. 14 at step 1404, the controller 102 determines predicted occupancy statuses 1504 within the predetermined time period. Here, the controller 102 may use information from a predicted occupancy schedule 110 to determine predicted occupancy statuses 1504 that correspond with the actual occupancy statuses 1502. For example, the controller 102 may use timestamps for the actual occupancy statuses 1502 to identify predicted occupancy statuses 1504 with a corresponding timestamp in the predicted occupancy schedule 110. Returning to the example in FIG. 15, the controller 102 may determine predicted occupancy statuses 1504 that correspond with the actual occupancy statuses 1502 for a user on a Monday between 8:00 am and 7:00 pm.

Returning to FIG. 14 at step 1406, the controller 102 identifies conflicting occupancy statuses 1506 between the actual occupancy statuses 1502 and the predicted occupancy statuses 1504. A conflicting occupancy status 1506 indicates a difference between an actual occupancy status 1502 and a predicted occupancy status 1504. The controller 102 may identify conflicting occupancy statuses 1506 by comparing the actual occupancy statuses 1502 to the predicted occupancy statuses 1504. Returning to the example in FIG. 15, the controller 102 identifies conflicting occupancy statuses between 12:00 am and 2:00 pm. In this example, the predicted occupancy status 1504 predicted that the user would be away from the space 122 during this time, however, the actual occupancy status 1502 shows that the user was present at the space 122 during this time.

In some embodiments, the controller 102 may be configured to ignore certain days when identifying conflicting occupancy statuses 1506. For example, the controller 102 may ignore weekends and/or holidays when identifying conflicting occupancy statuses 1506. In this case, the controller 102 may ignore these days due to their unique or widely varying behavior patterns for a user.

In some embodiments, the controller 102 may graphically present conflicting occupancy statuses 1506 to a user. For example, the controller 102 may generate a heat map that overlays the conflicting occupancy statuses 1506 with a predicted occupancy schedule 110. This allows a user to quickly identify when the conflicting occupancy statuses 1506 occurred. In other examples, the controller 102 may graphically present conflicting occupancy statuses 1506 to a user using any other suitable technique.

Once the controller 102 identifies one or more conflicting occupancy statuses 1506, the controller 102 will correct the predicted occupancy schedule 110 using previously stored occupancy historical information. In some embodiments, the controller 102 may be configured to only correct conflicting occupancy statuses 1506 when the number of conflicting occupancy statuses 1506 exceeds a predetermined threshold value. The predetermined threshold value corresponds with a maximum number of allowed conflicting occupancy statuses 1506 for a predicted occupancy schedule 110. When the number of conflicting occupancy statuses 1506 is less than the predetermined threshold value, this may indicate that the conflicting occupancy statuses 1506 may be outliers and the controller 102 does not need to correct these conflicting occupancy statuses 1506. However, when the number of conflicting occupancy statuses 1506 exceeds the predetermined threshold value, this may indicate that the predicted occupancy schedule 110 is deviating from the actual behavior of a user.

Returning to FIG. 14 at step 1408, the controller 102 selects a conflicting occupancy status 1506. Here, the controller 102 iteratively selects a conflicting occupancy status 1506 from among the identified conflicting occupancy statuses 1506 to correct. At step 1410, the controller 102 determines a historical occupancy status 1508 corresponding with the selected conflicting occupancy status 1506. The controller 102 may obtain historical occupancy statuses 1508 from an occupancy history log 602. For example, the controller 102 may identify a timestamp corresponding with the conflicting occupancy status 1506 and then use the timestamp to identify historical occupancy statuses 1508 from an occupancy history log 602. Returning to the example in FIG. 15, the controller 102 may identify a timestamp that corresponds with Monday at 12:00 am for a conflicting occupancy status 1506. The controller 102 may use the same timestamp (i.e. Monday at 12:00 am) to identify historical occupancy statuses 1508 from an occupancy history log 602.

In some instances, the controller 102 may identify multiple historical occupancy statuses 1508 corresponding with the selected conflicting occupancy status 1506. In this case, the controller 102 may use whichever occupancy status occurs most often as the historical occupancy status 1508. For example, the controller 102 may determine a percentage or a number of present statuses that occur within the multiple historical occupancy statuses 1508 corresponding with the selected conflicting occupancy status 1506. In this example, the controller 102 may determine that the historical occupancy status 1508 is a present status when the determined percentage is greater than fifty percent. The controller 102 may determine that the historical occupancy status 1508 is an away status when the determined percentage is less than fifty percent. The controller 102 may also use any other suitable percentage value for determining an historical occupancy status 1508. In other examples, the controller 102 may determine the historical occupancy status 1508 using any other suitable technique.

Returning to FIG. 14 at step 1412, the controller 102 identifies a time entry 902 in the predicted occupancy schedule 110 corresponding with the conflicting occupancy status 1506. The controller 102 may uses the same timestamp that is used in step 1410 to identify a corresponding time entry 902 in the predicted occupancy schedule 110. Continuing with the previous example, the controller 102 may use a timestamp that corresponds with Monday at 12:00 am to identify a time entry 902 in the predicted occupancy schedule 110.

At step 1414, the controller 102 updates the identified time entry 902 in the predicted occupancy schedule 110 based on the determined historical occupancy status 1508. Here, the controller 102 modifies or sets the identified time entry 902 in the predicted occupancy schedule 110 with the determined historical occupancy status 1508 from step 1410.

At step 1416, the controller 102 determines whether there are any more conflicting occupancy statuses 1506 to correct. Here, the controller 102 determines whether all of the conflicting occupancy statuses 1506 that were identified in step 1406 have been corrected. The controller 102 returns to step 1408 in response to determining that there are more conflicting occupancy statuses 1506 to correct. In this case, the controller 102 returns to step 1408 to select another conflicting occupancy status 1506 to repeat the correction process. Otherwise, the controller 102 may terminate method 1400. In this case, the controller 102 determines that it has finished correcting any conflicting occupancy statuses 1506.

In one embodiment, the controller 102 may use the updated predicted occupancy schedule 110 to retrain a machine learning model 112. For example, the controller 102 may use the updated predicted occupancy schedule 110 with a process similar to the process described in FIG. 7 to retrain a machine learning model 112. Retraining the machine learning model 112 allows the controller 102 to improve the accuracy of the machine learning model 112 for future predictions.

Controller Hardware Configuration

FIG. 16 is an embodiment of a device (e.g. controller 102) configured to control an HVAC system 104 using machine learning. The controller 102 comprises a processor 1602, a memory 1604, and a network interface 1606. The controller 102 may be configured as shown or in any other suitable configuration.

The processor 1602 comprises one or more processors operably coupled to the memory 1604. The processor 1602 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 1602 may be a programmable logic device, a microcontroller, a microprocessor, or any suitable combination of the preceding. The processor 1602 is communicatively coupled to and in signal communication with the memory 1604. The one or more processors are configured to process data and may be implemented in hardware or software. For example, the processor 1602 may be 8-bit, 16-bit, 32-bit, 64-bit or of any other suitable architecture. The processor 1602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a HVAC control engine 1608. In this way, processor 1602 may be a special purpose computer designed to implement the functions disclosed herein. In an embodiment, the HVAC control engine 1608 is implemented using logic units, FPGAs, ASICs, DSPs, or any other suitable hardware. The HVAC control engine 1608 is configured to operate as described in FIGS. 1-15. For example, the HVAC control engine 1608 may be configured to perform the steps of method 200, 700, 1100, and 1400 as described in FIGS. 2, 7, 11, and 14, respectively.

The memory 1604 comprises one or more disks, tape drives, or solid-state drives, and may be used as an over-flow data storage device, to store programs when such programs are selected for execution, and to store instructions and data that are read during program execution. The memory 1604 may be volatile or non-volatile and may comprise read-only memory (ROM), random-access memory (RAM), ternary content-addressable memory (TCAM), dynamic random-access memory (DRAM), and static random-access memory (SRAM).

The memory 1604 is operable to store HVAC control instructions 1610, event data 114, machine learning models 112, occupancy history logs 602, predicted occupancy schedules 110, historical set point temperature information 1202, and/or any other data or instructions. The HVAC control instructions 1610 may comprise any suitable set of instructions, logic, rules, or code operable to execute the HVAC control engine 1608. The event data 114, machine learning models 112, occupancy history logs 602, predicted occupancy schedules 110, historical set point temperature information 1202 are configured similar to the event data 114, machine learning models 112, occupancy history logs 602, predicted occupancy schedules 110, historical set point temperature information 1202 described in FIGS. 1-15, respectively.

The network interface 1606 is configured to enable wired and/or wireless communications. The network interface 1606 is configured to communicate data between the controller 102 and other devices (e.g. HVAC system 104, thermostat 106, and devices 108), systems, or domain. For example, the network interface 1606 may comprise a WIFI interface, a LAN interface, a WAN interface, a modem, a switch, or a router. The processor 1602 is configured to send and receive data using the network interface 1606. The network interface 1606 may be configured to use any suitable type of communication protocol as would be appreciated by one of ordinary skill in the art.

HVAC System Configuration

Figure 17:
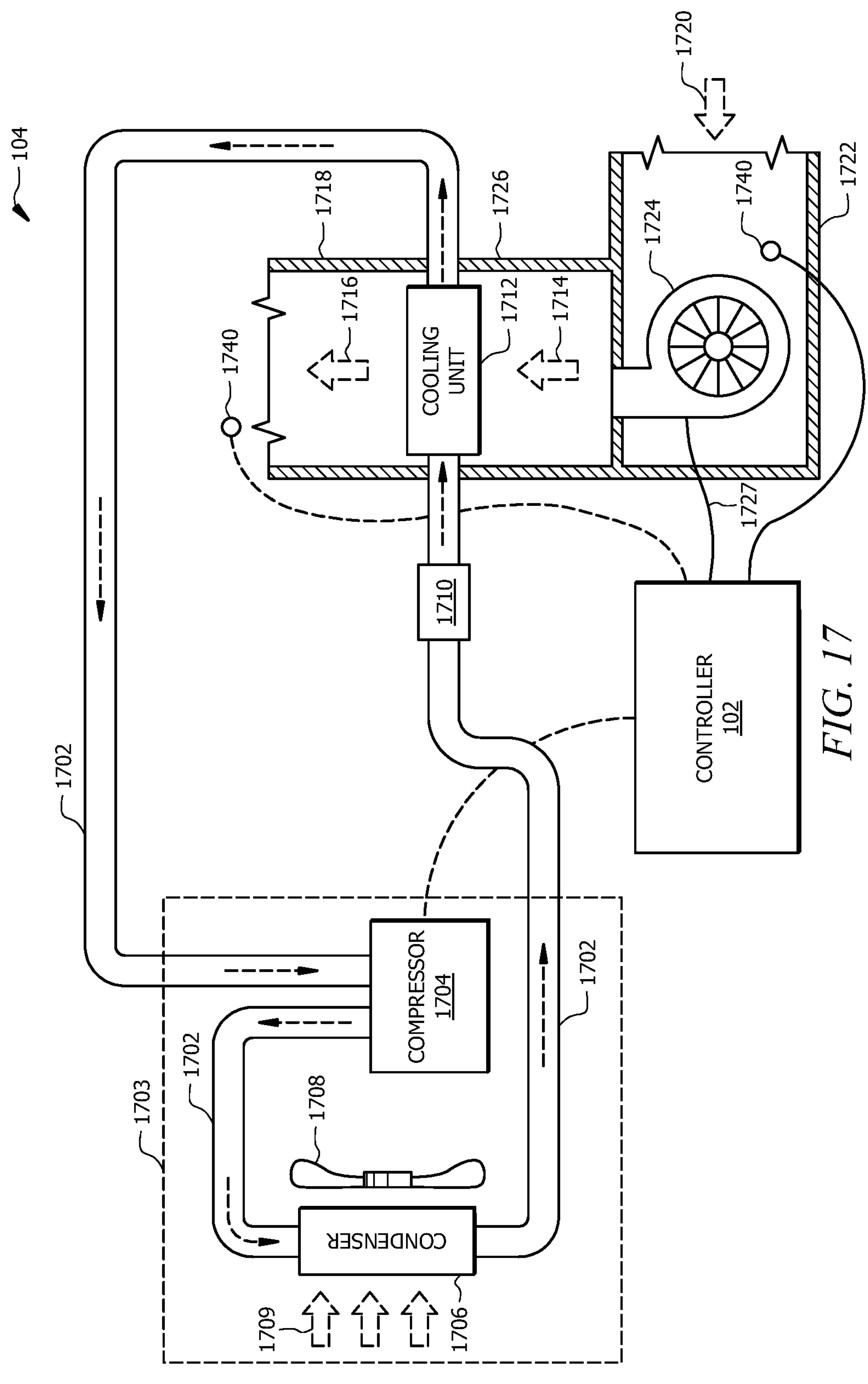
FIG. 17 is a schematic diagram of an embodiment of an HVAC system configured to use machine learning.

FIG. 17 is a schematic diagram of an embodiment of an HVAC system 104 configured to use machine learning. The HVAC system 104 conditions air for delivery to an interior space of a building. In some embodiments, the HVAC system 104 is a rooftop unit (RTU) that is positioned on the roof of a building and the conditioned air is delivered to the interior of the building. In other embodiments, portions of the system may be located within the building and a portion outside the building. The HVAC system 104 may also include heating elements that are not shown here for convenience and clarity. The HVAC system 104 may be configured as shown in FIG. 17 or in any other suitable configuration. For example, the HVAC system 104 may include additional components or may omit one or more components shown in FIG. 17.

The HVAC system 104 comprises a working-fluid conduit subsystem 1702 for moving a working fluid, or refrigerant, through a cooling cycle. The working fluid may be any acceptable working fluid, or refrigerant, including, but not limited to, fluorocarbons (e.g. chlorofluorocarbons), ammonia, non-halogenated hydrocarbons (e.g. propane), hydroflurocarbons (e.g. R-410A), or any other suitable type of refrigerant.

The HVAC system 104 comprises one or more condensing units 1703. In one embodiment, the condensing unit 1703 comprises a compressor 1704, a condenser coil 1706, and a fan 1708. The compressor 1704 is coupled to the working-fluid conduit subsystem 1702 that compresses the working fluid. The condensing unit 1703 may be configured with a single-stage or multi-stage compressor 1704. A single-stage compressor 1704 is configured to operate at a constant speed to increase the pressure of the working fluid to keep the working fluid moving along the working-fluid conduit subsystem 1702. A multi-stage compressor 1704 comprises multiple compressors configured to operate at a constant speed to increase the pressure of the working fluid to keep the working fluid moving along the working-fluid conduit subsystem 1702. In this configuration, one or more compressors can be turned on or off to adjust the cooling capacity of the HVAC system 104. In some embodiments, a compressor 1704 may be configured to operate at multiple speeds or as a variable speed compressor. For example, the compressor 1704 may be configured to operate at multiple predetermined speeds.

In one embodiment, the condensing unit 1703 (e.g. the compressor 1704) is in signal communication with a controller 102 using a wired or wireless connection. The controller 102 is configured to provide commands or signals to control the operation of the compressor 1704. For example, the controller 102 is configured to send signals to turn on or off one or more compressors 1704 when the condensing unit 1703 comprises a multi-stage compressor 1704. In this configuration, the controller 102 may operate the multi-stage compressors 1704 in a first mode where all the compressors 1704 are on and a second mode where at least one of the compressors 1704 is off. In some examples, the controller 102 may be configured to control the speed of the compressor 1704.

The condenser 1706 is configured to assist with moving the working fluid through the working-fluid conduit subsystem 1702. The condenser 1706 is located downstream of the compressor 1704 for rejecting heat. The fan 1708 is configured to move air 1709 across the condenser 1706. For example, the fan 1708 may be configured to blow outside air through the heat exchanger to help cool the working fluid. The compressed, cooled working fluid flows downstream from the condenser 1706 to an expansion device 1710, or metering device.

The expansion device 1710 is configured to remove pressure from the working fluid. The expansion device 1710 is coupled to the working-fluid conduit subsystem 1702 downstream of the condenser 1706. The expansion device 1710 is closely associated with a cooling unit 1712 (e.g. an evaporator coil). The expansion device 1710 is coupled to the working-fluid conduit subsystem 1702 downstream of the condenser 1706 for removing pressure from the working fluid. In this way, the working fluid is delivered to the cooling unit 1712 and receives heat from airflow 1714 to produce a treated airflow 1716 that is delivered by a duct subsystem 1718 to the desired space, for example a room in the building.

A portion of the HVAC system 104 is configured to move air across the cooling unit 1712 and out of the duct subsystem 1718. Return air 1720, which may be air returning from the building, fresh air from outside, or some combination, is pulled into a return duct 1722. A suction side of a variable-speed blower 1724 pulls the return air 1720. The variable-speed blower 1724 discharges airflow 1714 into a duct 1726 from where the airflow 1714 crosses the cooling unit 1712 or heating elements (not shown) to produce the treated airflow 1716.

Examples of a variable-speed blower 1724 include, but are not limited to, belt-drive blowers controlled by inverters, direct-drive blowers with electronically commutated motors (ECM), or any other suitable types of blowers. In some configurations, the variable-speed blower 1724 is configured to operate at multiple predetermined fan speeds. In other configurations, the fan speed of the variable-speed blower 1724 can vary dynamically based on a corresponding temperature value instead of relying on using predetermined fan speeds. In other words, the variable-speed blower 1724 may be configured to dynamically adjust its fan speed over a range of fan speeds rather than using a set of predetermined fan speeds. This feature also allows the controller 1734 to gradually transition the speed of the variable-speed blower 1724 between different operating speeds. This contrasts with conventional configurations where a variable-speed blower 1724 is abruptly switched between different predetermined fan speeds. The variable-speed blower 1724 is in signal communication with the controller 102 using any suitable type of wired or wireless connection 1727. The controller 102 is configured to provide commands or signals to the variable-speed blower 1724 to control the operation of the variable-speed blower 1724. For example, the controller 102 is configured to send signals to the variable-speed blower 1724 to control the fan speed of the variable-speed blower 1724. In some embodiments, the controller 102 may be configured to send other commands or signals to the variable-speed blower 1724 to control any other functionality of the variable-speed blower 1724.

The HVAC system 104 comprises one or more sensors 1740 in signal communication with the controller 102. The sensors 1740 may comprise any suitable type of sensor for measuring air temperature. The sensors 1740 may be positioned anywhere within a conditioned space (e.g. a room or building) and/or the HVAC system 104. For example, the HVAC system 104 may comprise a sensor 1740 positioned and configured to measure an outdoor air temperature. As another example, the HVAC system 104 may comprise a sensor 1740 positioned and configured to measure a supply or treated air temperature and/or a return air temperature. In other examples, the HVAC system 104 may comprise sensors 1740 positioned and configured to measure any other suitable type of air temperature.

The HVAC system 104 comprises one or more thermostats 106, for example located within a conditioned space (e.g. a room or building). A thermostat 106 may be a single-stage thermostat, a multi-stage thermostat, or any suitable type of thermostat as would be appreciated by one of ordinary skill in the art. The thermo stat 106 is configured to allow a user to input a desired temperature or temperature set point for a designated space 122 or zone such as the room. The controller 102 may use information from the thermostat 106 such as the temperature set point for controlling the compressor 1704 and the variable-speed blower 1724. The thermostat 106 is in signal communication with the controller 102 using any suitable type of wired or wireless communications.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A heating, ventilation, and air conditioning (HVAC) control device, comprising:

a memory operable to store a predicted occupancy schedule for a space comprising a plurality of time entries, wherein:

each time entry is associated with a predicted occupancy status; and each predicted occupancy status is associated with a confidence level; and a processor operably coupled to the memory, and configured to:

receive a user input for controlling an HVAC system, wherein the user input comprises instructions for an occupancy setting;

identify a first plurality of time entries that are associated with a confidence level for a predicted occupancy status that is less than a predetermined threshold value in the predicted occupancy schedule;

modify the predicted occupancy schedule by setting the first plurality of time entries to an away status in response to determining that the user input indicates a first setting type;

modify the predicted occupancy schedule by setting the first plurality of time entries to a present status in response to determining that the user input indicates a second setting type; and output the modified predicted occupancy schedule;

wherein:

each time entry in the predicted occupancy schedule is associated with a predicted heating set point temperature;

each predicted heating set point temperature is associated with a second confidence level; and the processor is further configured to:

obtain historical set point temperature information for the space within a predetermined time period, wherein the historical set point temperature information comprises a range of set point temperatures for the space during the predetermined time period;

determine a lowest set point temperature for the space during the predetermined time period;

identify a second plurality of time entries that are associated with a second confidence level for a predicted heating set point temperature that is less than a second predetermined threshold value in the predicted occupancy schedule; and modify the predicted occupancy schedule by setting the second plurality of time entries with a predicted heating set point temperature corresponding with the lowest set point temperature.

2. The device of claim 1, wherein outputting the modified predicted occupancy schedule comprises operating the HVAC system in accordance with the modified predicted occupancy schedule.

3. The device of claim 1, wherein outputting the modified predicted occupancy schedule comprises storing the modified predicted occupancy schedule in the memory.

4. A predictive temperature scheduling method, comprising:

receiving a user input for controlling an HVAC system, wherein the user input comprises instructions for an occupancy setting;

identifying a first plurality of time entries that are associated with a confidence level for a predicted occupancy status that is less than a predetermined threshold value in a predicted occupancy schedule, wherein the predicted occupancy schedule for a space comprises a plurality of time entries, wherein:

each time entry is associated with a predicted occupancy status; and each predicted occupancy status associated with a confidence level;

modifying the predicted occupancy schedule by setting the first plurality of time entries to an away status in response to determining that the user input indicates a first setting type;

modifying the predicted occupancy schedule by setting the first plurality of time entries to a present status in response to determining that the user input indicates a second setting type; and outputting the modified predicted occupancy schedule;

wherein:

each time entry in the predicted occupancy schedule is associated with a predicted heating set point temperature;

each predicted heating set point temperature is associated with a second confidence level; and further comprising:

obtaining historical set point temperature information for the space within a predetermined time period, wherein the historical set point temperature information comprises a range of set point temperatures for the space during the predetermined time period;

determining a lowest set point temperature for the space during the predetermined time period;

identifying a second plurality of time entries that are associated with a second confidence level for a predicted heating set point temperature that is less than a second predetermined threshold value in the predicted occupancy schedule; and modifying the predicted occupancy schedule by setting the second plurality of time entries with a predicted heating set point temperature corresponding with the lowest set point temperature.

5. The method of claim 4, wherein outputting the modified predicted occupancy schedule comprises operating the HVAC system in accordance with the modified predicted occupancy schedule.

6. The method of claim 4, wherein outputting the modified predicted occupancy schedule comprises storing the modified predicted occupancy schedule in a memory.

7. A non-transitory computer readable medium storing instructions that when executed by a processor cause the processor to:

receive a user input for controlling an HVAC system, wherein the user input comprises instructions for an occupancy setting;

identify a first plurality of time entries that are associated with a confidence level for a predicted occupancy status that is less than a predetermined threshold value in a predicted occupancy schedule, wherein the predicted occupancy schedule for a space comprises a plurality of time entries, wherein:

each time entry is associated with a predicted occupancy status; and each predicted occupancy status associated with a confidence level;

modify the predicted occupancy schedule by setting the first plurality of time entries to an away status in response to determining that the user input indicates a first setting type;

modify the predicted occupancy schedule by setting the first plurality of time entries to a present status in response to determining that the user input indicates a second setting type;

and output the modified predicted occupancy schedule;

wherein:

each time entry in the predicted occupancy schedule is associated with a predicted heating set point temperature;

each predicted heating set point temperature is associated with a second confidence level; and further comprising instructions that when executed by the processor causes the processor to:

obtain historical set point temperature information for the space within a predetermined time period, wherein the historical set point temperature information comprises a range of set point temperatures for the space during the predetermined time period;

determine a lowest set point temperature for the space during the predetermined time period;

identify a second plurality of time entries that are associated with a second confidence level for a predicted heating set point temperature that is less than a second predetermined threshold value in the predicted occupancy schedule; and modify the predicted occupancy schedule by setting the second plurality of time entries with a predicted heating set point temperature corresponding with the lowest set point temperature.

8. The non-transitory computer readable medium of claim 7, wherein outputting the modified predicted occupancy schedule comprises operating the HVAC system in accordance with the modified predicted occupancy schedule.

* * * * *